US011811842B2

(12) United States Patent
Bouazizi et al.

(10) Patent No.: US 11,811,842 B2
(45) Date of Patent: *Nov. 7, 2023

(54) ATTENTION (AT) INTERFACE FOR RADIO ACCESS NETWORK BITRATE RECOMMENDATIONS

(71) Applicant: QUALCOMM Incorporated, San Diego, CA (US)

(72) Inventors: Imed Bouazizi, Frisco, TX (US); Charles Nung Lo, San Diego, CA (US); Min Wang, San Diego, CA (US); Lenaig Genevieve Chaponniere, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 17/361,700

(22) Filed: Jun. 29, 2021

(65) Prior Publication Data

US 2022/0014581 A1 Jan. 13, 2022

Related U.S. Application Data

(60) Provisional application No. 63/049,539, filed on Jul. 8, 2020.

(51) Int. Cl.
*H04L 65/80* (2022.01)
*H04W 80/06* (2009.01)
(Continued)

(52) U.S. Cl.
CPC ............. *H04L 65/80* (2013.01); *H04L 65/40* (2013.01); *H04L 65/762* (2022.05);
(Continued)

(58) Field of Classification Search
CPC ....... H04L 65/80; H04L 65/40; H04L 65/762; H04L 65/612; H04L 47/24;
(Continued)

(56) References Cited

U.S. PATENT DOCUMENTS 11,252,612 B2 * 2/2022 Chang .................. H04W 28/22
11,284,302 B2 * 3/2022 Baek .................. H04W 28/0278
(Continued)

FOREIGN PATENT DOCUMENTS

WO 2017052436 A1 3/2017
WO WO-2017052436 A1 * 3/2017 ........... H04L 47/263
WO WO-2017196248 A1 * 11/2017 ......... H04L 65/1006

OTHER PUBLICATIONS

3GPP TS 38.321: "3rd Generation Partnership Project; Technical Specification Group Radio Access Network; NR; Medium Access Control (MAC) Protocol Specification (Release 16)", 3GPP TS 38.321, V16.0.0 (Mar. 2020), 3rd Generation Partnership Project (3GPP), Mobile Competence Centre, Sophia-Antipolis Cedex, France, vol. RAN WG2, No. V16.0.0, Apr. 9, 2020, pp. 1-140, XP051893926, Retrieved from the Internet: URL: ftp://ftp.3gpp.org/Specs/archive/38_series/38.321/38321-g00.zip. 38321-g00.docx [Retrieved on Apr. 9, 2020].

(Continued)

*Primary Examiner* — Javier O Guzman
(74) *Attorney, Agent, or Firm* — The Marbury Law Group, PLLC

(57) ABSTRACT

Various embodiments may provide streaming service downlink assistance and/or uplink assistance mechanisms for a wireless device using attention (AT) commands exchanged between a modem processor of the wireless device and another processor of the wireless device. Various embodiments may include an AT command that is a bitrate recommendation action command including an indication of a stream identifier, an indication of a requested bitrate, and an (Continued)

indication of a direction. Various embodiments may include an AT response that is a bitrate recommendation response, the bitrate recommendation response including an indication of a stream identifier, an indication of a bitrate recommendation, and an indication of a direction.

39 Claims, 16 Drawing Sheets

(51) Int. Cl.
  *H04W 28/02* (2009.01)
  *H04L 65/40* (2022.01)
  *H04W 28/04* (2009.01)
  *H04L 65/75* (2022.01)
(52) U.S. Cl.
  CPC ....... *H04W 28/0268* (2013.01); *H04W 28/04* (2013.01); *H04W 80/06* (2013.01)
(58) Field of Classification Search
  CPC . H04L 47/2483; H04L 47/25; H04L 47/2416; H04W 28/0268; H04W 28/04; H04W 80/06; H04W 40/22; H04W 28/22; H04W 28/0257
  See application file for complete search history.

(56) References Cited

U.S. PATENT DOCUMENTS

| | | | | |
|---|---|---|---|---|
| 11,337,105 | B2* | 5/2022 | Chang | H04W 36/0022 |
| 2018/0102871 | A1* | 4/2018 | Wu | H04W 36/00 |
| 2019/0037001 | A1 | 1/2019 | Fujishiro et al. | |
| 2019/0215729 | A1 | 7/2019 | Oyman et al. | |
| 2020/0305028 | A1 | 9/2020 | Chang | |
| 2020/0329128 | A1 | 10/2020 | Singh et al. | |
| 2020/0359395 | A1* | 11/2020 | Lohmar | H04L 65/752 |
| 2021/0029181 | A1 | 1/2021 | Ramamurthi et al. | |
| 2021/0045015 | A1 | 2/2021 | Phuyal et al. | |
| 2021/0099916 | A1* | 4/2021 | Dong | H04W 80/02 |
| 2021/0105216 | A1* | 4/2021 | Dai | H04L 41/0853 |
| 2021/0120540 | A1 | 4/2021 | Lo et al. | |
| 2021/0127305 | A1* | 4/2021 | Xu | H04L 43/0829 |
| 2022/0014962 | A1 | 1/2022 | Bouazizi et al. | |

OTHER PUBLICATIONS

International Search Report and Written Opinion—PCT/US2021/039799—ISA/EPO—dated Oct. 7, 2021. 15 pages.

Qualcomm Inc: "Provisioning Interface Updates", 3GPP Draft, 3GPP TSG-WG SA4 Meeting #90-e, S4-200745, 3rd Generation Partnership Project (3GPP), Mobile Competence Centre, Sophia-Antipolis Cedex, France, vol. SA WG4, No. May 20, 2020-Jun. 3, 2020, May 18, 2020, XP051886890, 3 Pages, Retrieved from the Internet: URL: https://ftp.3gpp.org/tsg_sa/WG4_CODEC/TSGS4_109-e/Docs/S4-200745.zip. S4-200745 Ran_Based_Assistance. docx [Retrieved on May 18, 2020] Paragraph [11.6.3].

Qualcomm Incorporated: "Addition of AT Commands for Exchange of Bit Rate Recommendation and Bit Rate Recommendation Queries", 3GPP Draft, 3GPP TSG-CT WG1 Meeting #125-e, C1-204658, 3rd Generation Partnership Project (3GPP), Mobile Competence Centre, Sophia-Antipolis Cedex, France, vol. CT WG1, No. Electronic Meeting, Aug. 20, 2020-Aug. 28, 2020, Aug. 13, 2020, XP051919240, 13 Pages, Retrieved from the Internet: URL: https://ftp.3gpp.org/tsg_ct/WG1_mm-cc-sm_ex-CN1/TSGC1_125e/Docs/C1-204658.zip. C1-204658.docx.

* cited by examiner

ATTENTION (AT) INTERFACE FOR RADIO ACCESS NETWORK BITRATE RECOMMENDATIONS

RELATED APPLICATIONS

This application claims the benefit of priority to U.S. Provisional Application No. 63/049,539, entitled "AT Interface For Radio Access Network Bitrate Recommendations" filed Jul. 8, 2020, the entire contents of which are hereby incorporated herein by reference for all purposes.

BACKGROUND

Long Term Evolution (LTE), Fifth Generation (5G) New Radio (NR), and other recently developed communication technologies allow wireless devices to communicate information at data rates (e.g., in terms of Gigabits per second, etc.) that are orders of magnitude greater than what was available just a few years ago.

Today's communication networks are also more secure, resilient to multipath fading, allow for lower network traffic latencies, provide better communication efficiencies (e.g., in terms of bits per second per unit of bandwidth used, etc.). These and other recent improvements have facilitated the emergence of the Internet of Things (IOT), large scale Machine to Machine (M2M) communication systems, autonomous vehicles, and other technologies that rely on consistent and secure communications.

SUMMARY

Various aspects of the present disclosure include methods, systems, and devices providing streaming service downlink assistance and/or uplink assistance mechanisms for a wireless device using Attention (AT) commands exchanged between a modem processor of the wireless device and another processor of the wireless device.

Various aspects may include a method for providing streaming service assistance performed by a modem processor of a wireless computing device. Various aspects may include receiving from another processor of the wireless device an AT command over the AT interface that is a bitrate recommendation action command for a streaming service, the bitrate recommendation action command including at least an indication of a first stream identifier, an indication of a requested bitrate, and an indication of a direction, determining a second stream identifier and a logical channel identifier (LCID) associated with the indication of the first stream identifier in response to receiving the AT command that is a bitrate recommendation action command from the other processor of the wireless device, sending a network assistance request to a base station of a radio access network (RAN) including the second stream identifier and LCID, receiving a network assistance response from the base station of the RAN including the second stream identifier and LCID, determining a bitrate recommendation in response to receiving the network assistance response from the base station of the RAN, and sending a response over the AT interface that is a bitrate recommendation response to the other processor of the wireless device, the bitrate recommendation response including at least the indication of the first stream identifier, an indication of the bitrate recommendation, and the indication of the direction.

In some aspects, the indication of the first stream identifier may be an indication of an Evolved Packet System (EPS) bearer for the streaming service. In some aspects, the indication of the first stream identifier may be an indication of a Protocol Data Unit (PDU) session for the streaming service. In some aspects, the bitrate recommendation action command further includes an indication of a Quality of Service (QoS) flow of the PDU session for the streaming service and the bitrate recommendation response further includes the indication of the QoS flow of the PDU session for the streaming service. In some aspects, the direction may be an indication of uplink or downlink.

Some aspects may further include starting a response timer in response to receiving the AT command that is a bitrate recommendation action command from the other processor of the wireless device over the AT interface, receiving an AT command that is a second bitrate recommendation action command from the other processor of the wireless device over the AT interface, the second bitrate recommendation action command including at least the indication of the first stream identifier, the indication of the requested bitrate, and the indication of the direction, determining whether the second bitrate recommendation action command is received before the response timer expires, and taking a bitrate request frequency limiting action in response to determining that the second bitrate recommendation action command is received before the response timer expires. In some aspects, the bitrate request frequency limiting action may include sending a response over the AT interface that is an error code to the other processor of the wireless device indicating the second bitrate recommendation action command was sent prematurely. In some aspects, the response that is the error code includes a retry-after parameter. In some aspects, the bitrate request frequency limiting action includes sending a response over the AT interface that is a second bitrate recommendation response to the other processor of the wireless device, the second bitrate recommendation response including at least the indication of the first stream identifier, the indication of the bitrate recommendation, the indication of the direction, and an indication of a time at which the network assistance response was received from the base station of the RAN. In some aspects, the bitrate request frequency limiting action may include not sending a response to the AT command that is the second bitrate recommendation action command.

Some aspects may further include determining the bitrate recommendation in response to receiving the network assistance response from the base station of the RAN comprises converting a bitrate recommendation indicated in the network assistance response from the base station of the RAN to an application level bitrate value, and the indication of the bitrate recommendation in the bitrate recommendation response is the application level bitrate value.

In some aspects, the modem processor of the wireless device may be a fifth generation (5G) modem processor.

Further aspects may include a wireless device having a processor configured to perform one or more operations of any of the methods summarized above. Further aspects may include a non-transitory processor-readable storage medium having stored thereon processor-executable instructions configured to cause a processor of a wireless device to perform operations of any of the methods summarized above. Further aspects include a wireless device having means for performing functions of any of the methods summarized above. Further aspects include a system on chip for use in a wireless device that includes a processor configured to perform one or more operations of any of the methods summarized above. Further aspects include a system in a package that includes two systems on chip for use in a wireless device that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1A:
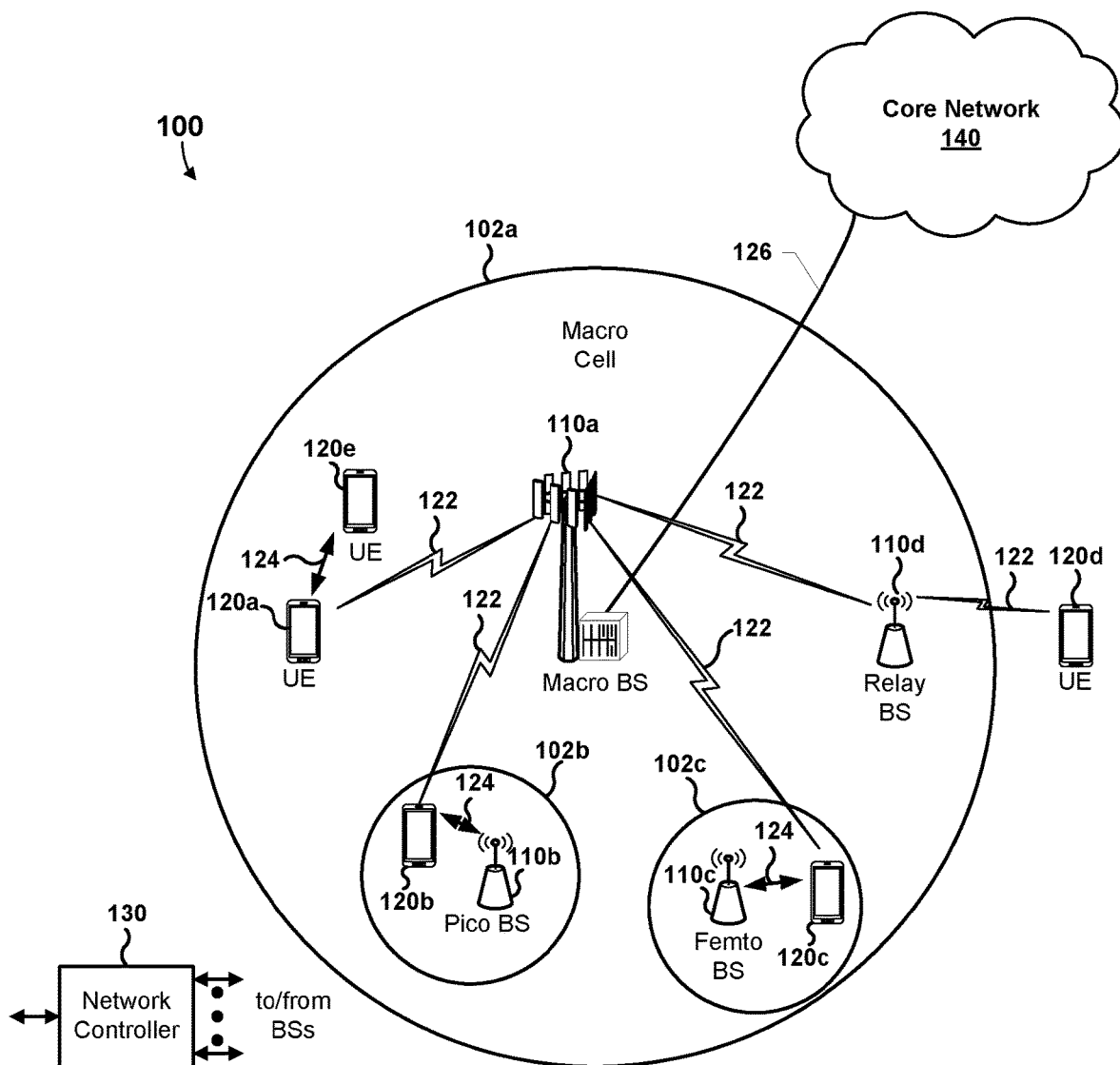
FIG. 1A is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments provide methods that may provide streaming service downlink assistance and/or uplink assistance mechanisms for a wireless device using attention (AT) commands and responses exchanged between a modem processor of the wireless device and another processor of the wireless device over an AT interface. Various embodiments may enable signalling between processors on a wireless device of a recommended bitrate for a streaming session (uplink or downlink recommended bitrate) on the wireless device, such as between a processor of the wireless device running a streaming service application and a modem processor of that wireless device. Various embodiments may include an AT command that is a bitrate recommendation action command for a streaming service including an indication of a stream identifier, an indication of a requested bitrate, and an indication of a direction. Some embodiments may include receiving a response over an AT interface that is a bitrate recommendation response, the bitrate recommendation response including an indication of a stream identifier, an indication of a bitrate recommendation, and an indication of a direction. In some embodiments, a response over an AT interface that is a bitrate recommendation response may be a response by a modem processor to a prior AT command received from another processor over the AT interface that is a bitrate recommendation action command for a streaming service. In some embodiments, a response over an AT interface (sometimes referred to as an "AT response") may be an unsolicited bitrate recommendation received from a modem processor of a wireless device. The unsolicited bitrate recommendation may be a push-type notification sent by the modem processor to another processor that is not associated with any specific AT command bitrate request previously sent to the modem processor. The unsolicited bitrate recommendation may include an unsolicited result code.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (e.g., central processing unit (CPU) core, Internet protocol (IP) core, graphics processor unit (GPU) core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

Streaming services, such as live uplink streaming (LUS) services, e.g., Facebook Live, YouTube Live, Twitch, Periscope, Instagram Live, etc., may be supported in fourth generation (4G) and fifth generation (5G) system (5GS) networks. In such user-generated live uplink streaming services, users, via their computing devices, can stream media content, such as video content, audio content, etc., to a network server associated with the live uplink streaming service. A different category of live uplink streaming services may be professionally-generated multimedia content, such as real-time video and audio feeds associated with breaking news reporting in the field, audio/visual streaming of sports events produced by venue-based cameras, etc. Regardless of the category of the live uplink streaming services (e.g., user-generated or professionally-generated), in live uplink streaming services, the streamed (or uploaded) content is in turn made available for viewing by other users via their respective computing devices. Both uplink and downlink network capacity can support upstream delivery and/or downlink distribution of media content in LUS services.

Network assistance may be a function supported for streaming services. Network assistance may enable a wireless device to ask a Network Assistance Service (NAssS) whether a higher bitrate in wireless reception or transmission (referred to as a "boost") can be supported, as well as to request a recommendation of an operational bitrate prior to a session starting. A wireless device receiving streaming services on the downlink (DL), may be referred to as requesting DL network assistance (DNA), while a wireless device sending streaming content on the uplink (UL), may be referred to as requesting uplink network assistance (UNA). Boost may be desirable to avoid the wireless device's media buffer to underflow (in DL reception) or overflow (in UL transmission) by allowing a higher bitrate to be used for DL reception or UL transmission. Additionally, higher bitrate wireless reception or transmission may reduce latency in a streaming service and higher bitrate wireless reception or transmission may support higher resolution streaming services (e.g., three-dimensional (3D) video streaming services, 8K ultra-high-definition (UHD) video streaming services, etc.). Network assistance requests may be messages sent by wireless devices asking whether an increase in the bitrate is supported by a radio access network (RAN) (e.g., a boost request) or messages sent by wireless devices asking for a recommended bitrate for a streaming session (uplink or downlink recommended bitrate). As specific examples, a network assistance request may be an Access Network Bitrate Recommendation Query (ANBRQ) message as defined for the Multimedia Telephone Service for Internet Protocol (IP) Multimedia Subsystem (IMS) (MTSI), a network assistance request may be a Recommended Bit Rate Query Medium Access Control (MAC) Control Element (CE) (MAC CE) as defined for Long Term Evolution (LTE) and Fifth Generation (5G) New Radio (NR), etc. Network assistance responses may be messages received by a wireless device indicating a recommended bitrate for a streaming session and/or an ability to support an increase in the bitrate (e.g., a boost status). As specific examples, a network assistance response may be an Access Network Bitrate Recommendation (ANBR) message as defined for the MTSI, a network assistance response may be a Recommended Bit Rate MAC CE as defined for LTE and 5G NR, etc.

While RANs, such as LTE RANs, 5G NR RANs, etc., may support RAN level signalling of a recommended bitrate for a streaming session (uplink or downlink recommended bitrate), current implementations do not support signalling of a recommended bitrate for a streaming session (uplink or downlink recommended bitrate) on a wireless device itself, such as between a processor of the wireless device running a streaming service application and a modem processor of that wireless device. The inability to support signalling of a recommended bitrate for a streaming session (uplink or downlink recommended bitrate) on a wireless device itself, such as between a processor of the wireless device running a streaming service application and a modem processor of that wireless device, may prevent current implementations from supporting application level streaming service assistance, such as application level bitrate controls.

Methods, systems, and devices of the various embodiments provide streaming service assistance on a wireless device, such as a wireless device that is requesting DNA, a wireless device that is requesting UNA, etc. Various embodiments enable the exchange of uplink and/or downlink bitrate recommendation requests, responses, and/or notifications between processors of a wireless device itself, such as between a processor of the wireless device running a streaming service application and a modem processor of that wireless device. Various embodiments may enable Attention (AT) commands and/or responses associated with uplink and/or downlink bitrate recommendation requests, responses, and/or notifications to be exchanged between processors of a wireless device. In some embodiments, a modem processor and other processors of a wireless device may exchange AT commands and/or responses with one another via an AT interface. As used herein, an "AT interface" refers to any connection, bus, or other type of communication pathway over which one processor may exchange AT commands and/or responses with another processor. In some embodiments, a processor of a wireless device running a streaming service application may operate as a Terminal Equipment (TE) for sending/receiving AT commands that are associated with uplink and/or downlink bitrate recommendation requests, responses, and/or notifications. In some embodiments, a modem processor of a wireless device, such as a modem processor providing a connection to a RAN, such as an LTE modem, 5G modem, etc., may operate as a Mobile Termination (MT) for sending/receiving AT commands that are associated with uplink and/or downlink bitrate recommendation requests, responses, and/or notifications. Various embodiments may enable uplink and/or downlink bitrate recommendation requests, responses, and/or notifications on a wireless device connected to a RAN, such as LTE RAN, 5G NR RAN, etc.

In various embodiments, an AT command associated with uplink and/or downlink bitrate recommendation requests, solicited responses to an AT command, and/or notifications, such as unsolicited responses to an AT command, may include parameters to unambiguously identify a logical channel (e.g., a logical channel identifier (LCID), etc.) that carries one or more media streams to which a network assistance request (e.g., a ANBRQ, Recommended Bit Rate Query MAC CE, etc.) and/or network assistance response (e.g., a ANBR, Recommended Bit Rate MAC CE, etc.) sent/received to/from a RAN, such as LTE RAN, 5G NR RAN, etc., by a RAN modem processor, such as a 5G modem processor, LTE modem processor, etc., pertains. In relation to LTE systems, streams as used herein may be associated with LTE Packet Data Network (PDN) connections. In relation to 5G systems, streams as used herein may be associated with Protocol Data Unit (PDU) sessions.

In some embodiments, a media session handler running on a processor of a wireless device may operate as a TE for sending/receiving AT commands that are associated with uplink and/or downlink bitrate recommendation requests, responses, and/or notifications. In some embodiments, the media session handler may include a network assistance sub-function or module that is configured to perform uplink and/or downlink bitrate recommendation request, response, and/or notification functions. In some embodiments, the media session handler may interface with application layer entities of the wireless device, such as media streaming aware applications (e.g., 5G Media Streaming (5GMS) aware applications, Evolved Universal Mobile Telecommunications System (UMTS) Terrestrial Radio Access Network (E-UTRAN) aware applications, etc.), media player applications, media streamer applications, etc.

Various embodiments may provide an AT command interface for bitrate requests, recommendations, and/or notifications. In some embodiment AT commands and responses for bitrate requests, recommendations, and/or notifications may employ extended commands and the +C syntax for command prefixes associated with digital cellular communications. Various embodiment AT commands may pertain to the packet domain. Various embodiment AT commands may support 5G system (5GS) Protocol Data Unit (PDU) sessions and associated Quality of Service (QoS) semantics, such as QoS flows, QoS flow identifiers (QFIs), QoS rules, etc. Various embodiment AT commands may support c connection establishment and Evolved Packet System (EPS) bearer semantics. Various embodiment AT commands may indicate the direction, such as uplink, downlink, etc., to which a bitrate request, recommendation, and/or notification applies. Various embodiment AT commands may support unsolicited result codes. In some embodiments, unsolicited bitrate recommendation notifications from a RAN received by a RAN modem processor may be passed by the RAN modem processor to another processor of the wireless device, such as another processor of the wireless device running a media session handler that interfaces with application layer entities of the wireless device. As a specific example, unsolicited bitrate recommendation notifications from a 5G NR RAN received by a 5G modem processor may be passed to a media session handler. In some embodiments, AT commands with unsolicited result codes may be passed to another processor of the wireless device, such as another processor of the wireless device running a media session handler that interfaces with application layer entities of the wireless device, by a RAN modem processor without the other processor explicitly subscribing to the RAN modem processor for reception of unsolicited result code AT commands.

Some embodiments may provide an AT command that is a bitrate recommendation action command. For example, the AT command that is a bitrate recommendation action command may be identified by the AT command syntax "+CGBRR".

In some embodiments, a bitrate request may be an AT command that is a bitrate recommendation action command including an indication of a stream identifier, such as an identifier of a PDU session, an identifier an EPS bearer, etc., an indication of a requested bitrate, such as an aggregate requested bitrate of the ensemble of QoS flows in a PDU session, a requested bitrate of an EPS bearer, a bitrate sum of a desired bitrate for a specific application data and/or specific QoS flow of interest (e.g., for which a boost or increased bitrate is requested) within a PDU session and bitrates of all other application data and/or QoS flows in that PDU session that are not of interest, etc., and an indication of a direction, such as UL, DL, etc. As a specific example, an AT command that is a bitrate recommendation action command may be "+CGBRR=<cid>,<reqBitrate>,<direction>". In this example, "<cid>" may be an integer type value specifying a stream identifier, such as a particular PDU session definition, "<reqBitrate>" may be an indication of a requested bitrate, such as an aggregate requested bitrate (e.g., in kilobit per second (kbit/s or kbps)) by a TE for the ensemble of QoS flows in the PDU session referenced by "<cid>" to be responded by a MT, and "<direction>" may be an indication of a direction, such as "UL" or "DL" of the bitrate request. In some embodiments, an AT command that is a bitrate recommendation action command may further include an indication of a particular QoS flow within a PDU session. As a specific example, an AT command that is a bitrate recommendation action command including an indication of a particular QoS flow within a PDU session may be "+CGBRR=<cid>,<reqBitrate>,<direction>, [<p_cid>]". In this example, "<cid>" may be an integer type value specifying a stream identifier, such as a particular PDU session definition "<reqBitrate>" may be an indication of a requested bitrate, such as an aggregate requested bitrate (e.g., in kilobit per second (kbit/s or kbps)) by a TE for the ensemble of QoS flows in the PDU session referenced by "<cid>" to be responded by a MT, "<direction>" may be an indication of a direction, such as "UL" or "DL" of the bitrate request, and "<p_cid>" may be an integer type value specifying a particular QoS flow within the PDU session referenced by "<cid>". The aggregate requested bitrate, such as <reqBitrate>, may represent a bitrate sum of a desired bitrate for a specific application data and/or specific QoS flow of interest, such as the QoS flow specified by <p_cid> (e.g., for which a boost or increased bitrate is requested), within a PDU session and bitrates of all other application data and/or QoS flows in that PDU session that are not of interest.

In some embodiments, a bitrate response may be a response to an AT command sent over an AT interface that is a bitrate recommendation response including an indication of a stream identifier, such as an identifier of a PDU session, an identifier an EPS bearer, etc., an indication of a bitrate recommendation, such as an aggregate bitrate recommendation for streaming operation of the ensemble of QoS flows in a PDU session, a bitrate recommendation for streaming operation of an EPS bearer, etc., and an indication of a direction, such as UL, DL, etc. As a specific example, a response over the AT interface that is a bitrate recommendation response may be "+CGBRR=<cid>,<recmBitrate>, <direction>". In in this example, "<cid>" may be an integer type value specifying a stream identifier, such as a particular PDU session definition, "<recmBitrate>" may be an indication of a bitrate recommendation, such as an aggregate bitrate recommendation (e.g., in kbit/s) sent from a MT to a TE for streaming operation for the ensemble of QoS flows in the PDU session referenced by "<cid>", and "<direction>" may be an indication of a direction, such as "UL" or "DL" of the bitrate response. In some embodiments, a response over the AT interface that is a bitrate recommendation response may further include an indication of a particular QoS flow within a PDU session. As a specific example, a response over the AT interface that is a bitrate recommendation response including an indication of a particular QoS flow within a PDU session may be "+CGBRR=<cid>,<recmBitrate>,<direction>[,<p_cid>]". In in this example, "<cid>" may be an integer type value specifying a stream identifier, such as a particular PDU session definition, "<recmBitrate>" may be an indication of a bitrate recommendation, such as an aggregate bitrate recommendation (e.g., in kbit/s) sent from a MT to a TE for streaming operation for the ensemble of QoS flows in the PDU session referenced by "<cid>", "<direction>" may be an indication of a direction, such as "UL" or "DL" of the bitrate response, and "<p_cid>" may be an integer type value specifying a particular QoS flow within the PDU session referenced by "<cid>". In some embodiments, a response that is a bitrate recommendation response may be sent from a MT to a TE in response to the TE sending an AT command that is a bitrate recommendation action command to the MT.

In some embodiments, a response over the AT interface that is a bitrate recommendation response may be sent as an unsolicited result code from a MT to a TE including a bitrate recommendation value provided by the MT in the form of an unsolicited notification. As a specific example, a response over the AT interface is an unsolicited notification of a bitrate recommendation may be "+CGBRR [<recmBitrate>] ". In in this example, "<recmBitrate>" may be an indication of a bitrate recommendation, such as a bitrate recommendation value (e.g., in kbit/s).

In some embodiments, a test command may be sent from a TE to a MT to determine whether or not the MT supports sending a response that is a bitrate recommendation response to an AT command that is a bitrate recommendation action command. As a specific example, a TE may send a test command "+CGBRR=?" to a MT as a query as to whether or not the MT supports sending a response that is a bitrate recommendation response to an AT command that is a bitrate recommendation action command. In some embodiments, a MT supporting sending a response that is a bitrate recommendation response to an AT command that is a bitrate recommendation action command may respond to a test code with a supported response. As a specific example, a MT may send a supported response of "+CGBRR=OK" to a TE in response to a test command "+CGBRR=?" thereby indicating the MT supports sending a response that is a bitrate recommendation response to an AT command that is a bitrate recommendation action command. As another specific example, a MT may return values supported as compound values to a TE in response to a test command "+CGBRR=?" thereby indicating that the MT supports sending a response that is a bitrate recommendation response to an AT command that is a bitrate recommendation action command. In some embodiments, a MT not supporting sending a response that is a bitrate recommendation response to an AT command that is a bitrate recommendation action command may respond to a test code with a not supported response. As a specific example, a MT may send a not supported response of "+CGBRR=ERROR" to a TE in response to a test command "+CGBRR=?" thereby indicating the MT does not support sending a response that is a bitrate recommendation response to an AT command that is a bitrate recommendation action command. In some embodiments, a MT supporting sending a response that is a bitrate recommendation response to an AT command that is a bitrate recommendation action command may be mandatory in response to an action request. In some embodiments, a MT supporting sending a response that is a bitrate recommendation response may be mandatory to support the unsolicited notification of bitrate recommendation implemented in the form of an unsolicited result code.

Various embodiments may enable a frequency of bitrate requests by a TE to be limited by a MT. Network assistance messages, such as ANBRQ messages, may be limited on a per logical channel and direction basis. For example, a "bitRateQueryProhibitTimer" field in the "LogicalChannelConfig" information element (IE) may limit the frequency of ANBRQ messages sent by a wireless device to a RAN. In some embodiments, a response of a MT to bitrate requests from a TE may be limited on a per logical channel and direction basis. In some embodiments, a response timer may control the response of a MT to bitrate recommendation action commands from a TE. As an example, the same limit of the frequency of ANBRQ messages as set in the "bitRateQueryProhibitTimer" field in the "LogicalChannelConfig" IE may be applied to control the MT's response to bitrate requests from a TE. In various embodiments, a response timer may be started by a MT in response to receiving an initial bitrate recommendation action command from a TE. In an embodiment, in response to a TE sending a successive bitrate recommendation action command before the response timer has expired, the MT may return an error code, such as an error code indicating the latest bitrate recommendation action command was sent prematurely. In some embodiments, the error code may include a "retry-after" parameter. In an embodiment, in response to a TE sending a successive bitrate recommendation action command before the response timer has expired, the MT may return the latest bitrate recommendation applicable to the stream identifier, such as an identifier of a PDU session, an identifier an EPS bearer, etc., indicated in the latest bitrate recommendation action command. In some embodiments, the latest bitrate recommendation sent by the MT may include an indication of a wall-clock time at which a network assistance response, such as an ANBR message, etc., was received from the RAN that corresponded to the latest bitrate recommendation. In an embodiment, in response to a TE sending a successive bitrate recommendation action command before the response timer has expired, the MT may take no action. In some embodiments, a TE may be configured to interpret the absence of a response from a MT to a bitrate recommendation action command as an indication that a last bitrate recommendation sent by the MT is still valid.

In various embodiments, streams, such as QoS flows, EPS bearers, etc., may map to RAN Layer 2 (L2) parameters. In various embodiments, a TE (e.g., an application running on a processor of a wireless device, such as a media session handler, etc.) may indicate to a modem processor of the wireless device (e.g., a 5G modem, LTE modem, etc.), the stream (e.g., the QoS flow, EPS bearer, etc.) corresponding to the media streaming application flow for which bitrate recommendation, or boost, is sought. As an example, an application may identify to the modem the QoS Flow (for example, by the QoS Flow Identifier (QFI)) corresponding to the media streaming application flow for which bitrate recommendation or boost is sought, the associated PDU session identifier, and the requested streaming bitrate, using the action/execute command "+CGBRR=<cid>,<reqBitrate>,<direction>[,<p_cid>]".

In various embodiments, the modem processor receiving a bitrate recommendation action command may map the stream identifier (e.g., the value of "<cid>") to an internally referenced PDU session and associated LCID in a Recommended Bit Rate MAC CE that is used in bitrate recommendation query/response/notification interaction with the RAN.

In various embodiments, upon wireless device establishment of a PDU session with a Session Management Function (SMF) via Non-Access Stratum (NAS) signaling, the SMF may return authorized QoS rules for use by the wireless device. In some embodiments, the SMF may also assign, for each QoS flow in the PDU session, an associated QFI and QoS profile which may be provided to a base station the wireless device is camped on, such as an eNB, gNB, etc., via an Access and Mobility management Function (AMF). There may be a one-to-one correspondence between RAN L2 parameters for LCID, Data Radio Bearer (DRB) identifier (DRB ID), QFI, and Radio Resource Control (RRC) parameters define radio bearer and corresponding Service Data Adaption Protocol (SDAP) (e.g., for NR only), Packet Data Convergence Protocol (PDCP), Radio Link Control (RLC), and MAC configuration. As a result, a base station that the wireless device is camped on, such as an eNB, gNB, etc., may be able to unambiguously map the PDU session and its contained QoS flow(s) for bitrate recommendation treatment to a DRB.

In some embodiments, the requested and/or recommended bit rates indicated in AT commands and responses exchanged between a TE and a MT on a wireless device may be the same as the requested and/or recommended bit rates exchanged between the wireless device and a RAN. In some embodiments, the requested and/or recommended bit rates indicated in AT commands exchanged between a TE and a MT on a wireless device may not be the same as the requested and/or recommended bit rates exchanged between the wireless device and a RAN. For example, the modem requested bitrate in ANBRQ might not be the same as the application requested bitrate <reqBitRate> in the AT command+CGBRR, and similarly,<recmBitRate> in the AT response might not be the same as the ANBR returned from the RAN. The reason for the difference may be, for example, that ANBRQ/ANBR messages may represent bitrate values at the MAC layer, whereas <reqBitRate> and <recmBitRate> in AT commands may correspond to application layer bit rates (e.g., the values in the Recommended Bitrate Query MAC CE and Recommended Bitrate MAC CE include higher layer transmission overhead associated with MAC, RLC, PDCP, IP, and User Datagram Protocol (UDP) (or Transmission Control Protocol (TCP)) operations. In some embodiments, a modem may perform the necessary conversion and mapping between the values in ANBRQ/ANBR messages and <reqBitRate>/<recmBitRate> in AT commands to account for the difference in protocol layer reference of these messages. In some embodiments, a media session handler may perform the conversion/mapping between MAC and application level bitrate values. For example, the media session handler may obtain information from the modem of any additional QoS flows (contending for the RAN bitrate expressed by ANBR) and their bitrate requirements, and upper layer transport overheads, and information from a Media Player (in case of DL streaming) of the operation points of other application flows sent in the same PDU session to support the conversion/mapping between MAC and application level bitrate values.

In some embodiments, controlling the streaming service based at least in part on the indication of the bitrate recommendation may include deriving the bitrate increase (or boost) for a QFI or QoS flow of interest (e.g., for which a boost or increased bitrate was requested) from the bitrate recommendation in a response received over the AT interface from a modem processor of the wireless device. The bitrate recommendation received from the modem processor, such as the "<recmBitrate>" may be an indication of an aggregate bitrate recommendation (e.g., in kbit/s) for the ensemble of QoS flows in a PDU session, such as the PDU session referenced by "<cid>". The recommended bitrate (e.g., the boosted or increased bitrate) for the specific application data and/or specific QoS flow of interest, such as the QoS flow specified by <p_cid> (e.g., for which a boost or increased bitrate was requested), may be determined by subtracting the sum of bitrates of all other application data and/or QoS flows in that PDU session that are not of interest from the aggregate bitrate recommendation received from the modem processor, such as the "<recmBitrate>" that may be an indication of an aggregate bitrate recommendation for the ensemble of QoS flows in the PDU session. The resulting value may be the recommended bitrate (e.g., the boosted or increased bitrate) for the specific application data and/or specific QoS flow of interest, such as the QoS flow specified by <p_cid>.

In some embodiments, a bitrate request may be an AT command that is a bitrate recommendation action command sent from a processor of a wireless device to a RAN modem of the wireless device over the AT interface to trigger the RAN modem to send a Recommended Bit Rate Query MAC CE for a PDN connection or PDU session. In some embodiments, such a bitrate request to trigger a Recommended Bit Rate Query MAC CE for a PDN connection or PDU session may be an AT command including an indication of a stream identifier, such as an identifier of a PDU session, an identifier a PDN connection, etc., an indication of a requested bitrate, such as an aggregate requested bitrate of the PDN connection or PDU session, etc., an indication of a direction, such as UL, DL, etc., and, optionally, an indication of a QFI of a particular QoS flow within a PDU session. As a specific example, an AT command that is a bitrate recommendation action command may be "+CGBRRREQ=<cid>,<reqBitrate>,<direction>,[<p_cid>]". In this example, "<cid>" may be an integer type value specifying a stream identifier, such as a particular PDU session or PDN connection, "<reqBitrate>" may be an indication of a requested bitrate, such as an aggregate requested bitrate (e.g., in kilobit per second (kbit/s or kbps)) by a TE for the PDN connection or PDU session identified by "<cid>", "<direction>" may be an indication of a direction, such as "UL" or "DL" of the bitrate request, and, when included, "<p_cid>" may be an integer type value specifying a QFI of a particular QoS flow within the PDU session identified by "<cid>.

In response to receiving an AT command that may be a bitrate request to trigger a Recommended Bit Rate Query MAC CE for a PDN connection or PDU session, the modem processor may send a Recommended Bit Rate Query MAC CE for a PDN connection or PDU session identified in the AT command (e.g., the PDN connection or PDU session identified by the "<cid>". In some embodiments, when the modem processor does not support such triggering, the modem processor may return a response that includes an error code on the AT interface, such as "+CME ERROR:<err>".

In some embodiments, a processor may test the modem processor to determine the values for streams, such as PDN connections, PDU sessions, etc., for which the modem processor may be configured to be triggered for sending a Recommended Bit Rate MAC CE. For example, a processor may send an AT command "+CGBRRREQ=?" as a test command to the modem processor over the AT interface. In response to the test command, in some embodiments, the modem processor may send a response over the AT interface indicating the range of supported streams, range of supported requested bitrates, range of supported directions, and range of supported QFIs of QoS flows. For example, the modem processor may send over the AT interface in response to the test command, the response "+CGBRRREQ: (range of supported <cid>s), (range of supported <reqBitrate>s), (range of supported <direction>s, (range of supported <p_cid>s)". In this example, "<cid>" may be an integer type value specifying a stream identifier, such as a particular PDU session or PDN connection, "<reqBitrate>" may be an indication of a requested bitrate, such as an aggregate requested bitrate (e.g., in kilobit per second (kbit/s or kbps)) by a TE for the PDN connection or PDU session identified by "<cid>", "<direction>" may be an indication of a direction, such as "UL" or "DL" of the bitrate request, and "<p_cid>" may be an integer type value specifying a QFI of a particular QoS flow within the PDU session identified by "<cid>". The supported ranges may be sent as a compound value in the response.

In some embodiments, a processor of the wireless device, such as a processor of the wireless device running a media session handler that interfaces with application layer entities of the wireless device, may send an AT command to a modem processor to subscribe to unsolicited result responses from a RAN modem processor of the wireless device, such as unsolicited bitrate recommendation responses or notifications from the RAN modem processor. In such embodiments, AT commands with unsolicited result codes may be passed to the processor of the wireless device, such as the processor of the wireless device running a media session handler that interfaces with application layer entities of the wireless device, by the RAN modem processor after the processor explicitly subscribes to the RAN modem processor for reception of unsolicited result code AT commands/responses. As a specific example, the processor may send the AT command "+CGBRRREP=[<reporting>]" over the AT interface to the modem processor to enable (e.g., subscribe to) reporting of the recommended bitrate received from the RAN in a Recommended Bit Rate MAC CE. This may prompt the unsolicited result code+CGBRR:<cid>, <recmBitrate>,<direction>[,<p_cid>]. In this example, "<reporting>" may be an integer type, such as "0" meaning reporting not enabled and "1" meaning reporting is enabled, "<cid>" may be an integer type that identifies the PDN connection or PDU session to which the recommended bit rate applies, "<direction>" may be a string type that indicates the direction ("UL" or "DL") to which the recommended bit rate applies, and "<p_cid>" may be an integer type that indicates the QFI of the QoS flow to which the recommended bit rate applies.

In response to the AT command subscribing to the unsolicited responses from the modem processor, the modem processor may indicate whether or not reporting of unsolicited bitrate recommendation responses is supported or not by the modem processor. In some embodiments, when the modem processor does not support sending unsolicited bitrate recommendation responses, the modem processor may indicate an error in a response over the AT interface, such as "+CME ERROR:<err>".

In some embodiments, the processor may request the status of the modem providing unsolicited bitrate recommendation responses. For example, the processor may send the modem processor an AT command "+CGBRRREP?" and the modem processor may return the response over the AT interface "CGBRRREP:<reporting>. In this example, "<reporting>" may be an integer type, such as "0" meaning reporting not enabled and "1" meaning reporting is enabled.

In some embodiments, a test command may be sent by a processor over an AT interface to a modem processor to request the values supported for unsolicited bitrate recommendation responses. For example, the processor may send the modem processor an AT command "+CGBRRREP=?" and the modem processor may return the response over the AT interface "CGBRRREP:(list of supported <reporting>s) ". In this example, "(list of supported <reporting>s)" may be a compound value of all the values supported for unsolicited bitrate recommendation responses. In some embodiments, the value of <reporting> by the TE may be either "0" or "1" and the returned values from the MT may simply be one of three possibilities: 1) "0"; 2) "1"; or 3) both "0" and "1").

In some embodiments, a TE (e.g., an applications processor) on a wireless device may trigger an MT (e.g., a modem processor) on the wireless device to return a solicited bitrate recommendation in response to an AT command. For example, the AT command "+CGBRRREQ" may be useful for other embodiments or new AT command. In this manner, a bitrate recommendation sent from the MT of the wireless device (e.g., the modem processor) to the TE of the wireless device (e.g., the applications processor) may be a solicited result.

In some embodiments, a processor of the wireless device, such as a processor of the wireless device running a media session handler that interfaces with application layer entities of the wireless device, may send an AT command to a RAN modem processor of the wireless device as an execution command that instructs the RAN modem processor to send to a RAN for an indicated direction (e.g., UL, DL, etc.) a Recommended Bit Rate Query MAC CE for a PDN connection or PDU session, and additionally instructs the RAN modem processor to return to the processor the recommended bitrate value corresponding to the Recommended Bit Rate MAC CE received by the RAN modem processor in response to the previous query. As a specific example, an AT command that is a bitrate recommendation action command sent from the TE instructing the MT to send a query to the RAN and return the result of that query from the RAN to the TE, may be "+CGBRR[=<cid>,<reqBitrate>,<direction>,[<p_cid>]]", and the response sent over the AT interface from the MT to the TE when the MT receives the Recommended Bit Rate MAC CE from the RAN may be "+CGBRR:<cid>,<recmBitrate>,<direction>,[<p_cid>]". In this example, "<cid>" may be an integer type value specifying a stream identifier, such as a particular PDU session or PDN connection that identifies the PDN connection or PDU session to which the recommended bitrate query or response applies, and "<reqBitrate>" may be an indication of a requested bitrate, such as an aggregate requested bitrate (e.g., in kilobit per second (kbit/s or kbps)) by a TE for the PDN connection or PDU session identified by "<cid>" to be mapped by the MT to the Recommended Bit Rate Query MAC CE the MT sends to the RAN. Also in this example, "<recmBitrate>" may be an indication of an aggregate bitrate recommendation (e.g., in kbit/s) for the PDU session or PDN connection referenced by "<cid>" and corresponding to the bit rate in the Recommended Bit Rate MAC CE received by the MT from the RAN for that PDU session or PDN connection, and "<direction>" may be a string type indication of a direction, such as "UL" or "DL" of the bitrate request or the response. Also in this example, "<p_cid>," when included, may be an integer type value identifying the QFI of the QoS flow to which the recommended bitrate query or response applies.

In some embodiments, when the modem processor does not support triggered bitrate recommendation responses, the modem processor may indicate an error in a response over the AT interface, such as "+CME ERROR:<err>". In some embodiments, the processor may request the status of the modem being triggered by an AT action/execution command for a bitrate recommendation. For example, the processor may send the modem processor an AT command "+CGBRR=?" as a test command. In some embodiments, the test command may return the range of supported values for stream identifiers, such as PDU session or PDN connection identifiers (e.g., "<cid>"), QFI of the QoS flows (e.g., "<p_cid>"), and requested bitrates (e.g., "<reqBitrate>"), along with the list of supported values for direction (e.g., "<direction>"). For example, the ranges may be returned as a compound value. As a specific example, in response to the test command, the MT may send on the AT interface to the TE the response "+CGBRR:(range of supported <cid>s), (range of supported <reqBitrate>s), (list of supported <direction>s,[(range of supported <p_cid>s)]".

In some embodiments, a processor of the wireless device, such as a processor of the wireless device running a media session handler that interfaces with application layer entities of the wireless device, may send an AT command to a modem processor to subscribe to bitrate recommendation reporting. The processor may send a set command to the modem processor to enable reporting of the recommended bitrate received from the RAN via the Recommended Bit Rate MAC CE by an unsolicited result code response sent to the processor from the modem processor over the AT interface. As a specific example, the processor may send the AT command "+CGBRRREP=[<reporting>]" over the AT interface to the modem processor to enable (e.g., subscribe to) reporting of the recommended bitrate received from the RAN in a Recommended Bit Rate MAC CE by the modem processor over the AT interface by unsolicited result code +CGBRR:<cid>,<recmBitrate>,<direction>[,<p_cid>]. In this example, "<reporting>" may be an integer type, such as "0" meaning reporting is disabled and "1" meaning reporting is enabled, "<cid>" may be an integer type that identifies the PDN connection or PDU session to which the recommended bit rate applies, and "<recmBitrate>" may be an indication of an aggregate bitrate recommendation (e.g., in kbit/s) for the PDU session or PDN connection referenced by "<cid>" and corresponding to the bit rate in the Recommended Bit Rate MAC CE received by the MT from the RAN for that PDU session or PDN connection and mapped to the most recent Recommended Bit Rate MAC CE the modem received from the RAN. Also in this example, "<direction>" may be a string type that indicates the direction ("UL" or "DL") to which the recommended bit rate applies, and "<p_cid>" may be an integer type that indicates the QFI of the QoS flow to which the recommended bit rate applies. In some embodiments, the read command, such as "+CGBRRREP?", may return the current command setting, such as in the response over the AT interface of "+CGBR-REP:<reporting>" where "<reporting>" may be an integer type, such as "0" meaning reporting is disabled and "1" meaning reporting is enabled. In some embodiments, the test command, such as "+CGBRRREP=?", may return the supported <reporting> values as a compound value.

FIG. 1A is a system block diagram illustrating an example communication system 100 suitable for implementing any of the various embodiments. The communications system 100 may be a Fifth Generation (5G) New Radio (NR) network, or any other suitable network such as an LTE network, 5G network, etc. While FIG. 1A illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of mobile devices (also referred to as user equipment (UE) computing devices) (illustrated as wireless device 120a-120e in FIG. 1A). The communications system 100 may also include a number of base stations (illustrated as the BS 110a, the BS 110b, the BS 110c, and the BS 110d) and other network entities. A base station is an entity that communicates with wireless devices (mobile devices or UE computing devices), and also may be referred to as an NodeB, a Node B, an LTE evolved nodeB (eNB), an Access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted Access by mobile devices with service subscription. A pico cell may cover a relatively small geographic area and may allow unrestricted Access by mobile devices with service subscription. A femto cell may cover a relatively small geographic area (for example, a home) and may allow restricted Access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1A, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network.

The base station 110a-110d may communicate with the core network 140 over a wired or wireless communication link 126. The wireless device 120a-120e (UE computing device) may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and send a transmission of the data to a downstream station (for example, a wireless device or a base station). A relay station also may be a mobile device that can relay transmissions for other wireless devices. In the example illustrated in FIG. 1A, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and Control for these base stations. The network controller 130 may communicate with the base stations via a backhaul. The base stations also may communicate with one another, for example, directly or indirectly via a wireless or wireline backhaul.

The wireless devices (UE computing devices) 120a, 120b, 120c may be dispersed throughout communications system 100, and each wireless device may be stationary or mobile. A wireless device also may be referred to as an Access terminal, a UE, a terminal, a mobile station, a subscriber unit, a station, etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more radio Access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL Control data.

Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A wireless device 120a-e may be included inside a housing that houses components of the wireless device, such as processor components, memory components, similar components, or a combination thereof.

In general, any number of communications systems and any number of wireless networks may be deployed in a given geographic area. Each communications system and wireless network may support a particular radio Access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some implementations, two or more mobile devices 120a-e (for example, illustrated as the wireless device 120a and the wireless device 120e) may communicate directly using one or more sidelink channels 124 (for example, without using a base station 110a-110d as an intermediary to communicate with one another). For example, the wireless devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-e may perform scheduling operations, resource selection operations, as well as other operations described elsewhere herein as being performed by the base station 110a-110d.

Figure 1B:
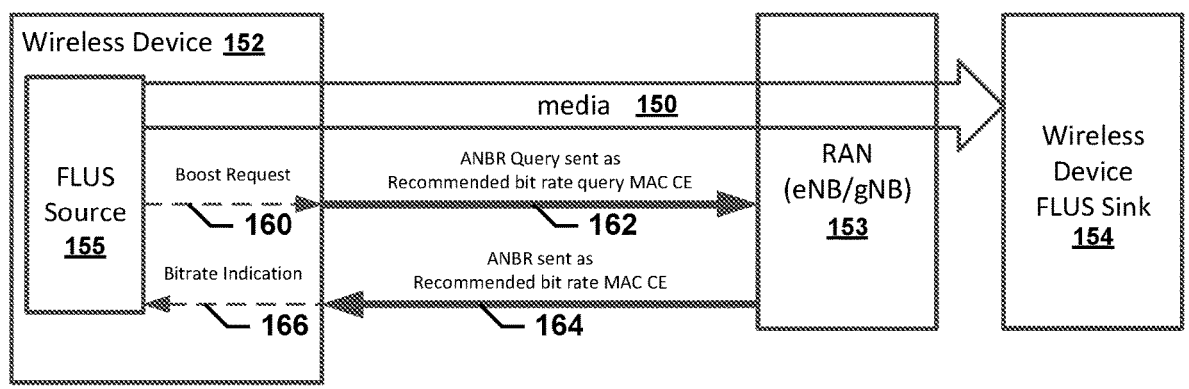
FIG. 1B is a system block diagram illustrating example communications to support streaming service assistance in a communication system.

FIG. 1B is a system block diagram illustrating example communications to support streaming service assistance, such as streaming service assistance for a Framework for Live Uplink Streaming (FLUS) service, in a communication system (e.g., communications system 100). With reference to FIGS. 1A and 1B, a streaming service source, such as a FLUS source 155 of a wireless device 152 (e.g., wireless device 120a-120e), may provide a live uplink media stream 150 to be offered in the live uplink streaming session to a live uplink streaming sink wireless computing device, such as a wireless device 154 (e.g., wireless device 120a-120e) that is a wireless FLUS sink computing device. The live uplink media stream 150 may be sent from the FLUS source 155 to the FLUS sink 154 via a RAN 153, including a base station (e.g., base station 110a-110d), such as an eNB, gNB, etc., the wireless device 152 is camped on. The FLUS source 155 of the wireless device 152 may request a higher bitrate in wireless reception or transmission (referred to as a "boost") in a boost request 160. In response to the boost request 160, the wireless device 152 may send a network assistance request, such as an ANBRQ as a Recommended Bit Rate Query MAC CE 162, to the RAN 153, for example to the eNB/gNB on which the wireless device 152 is camped. In response to the network assistance request, the RAN 153, for example the eNB/gNB on which the wireless device 152 is camped, may send a network assistance response, such as an ANBR sent as a Recommend Bit Rate MAC CE 164 to the wireless device 152. Based on the network assistance response received, the FLUS source 155 may receive a bitrate indication 166. The bitrate indication 166 may be a recommended bitrate for the streaming session for the media stream 150 and/or an ability to support (or not support) an increase in the bitrate (e.g., a boost status).

Figure 2:
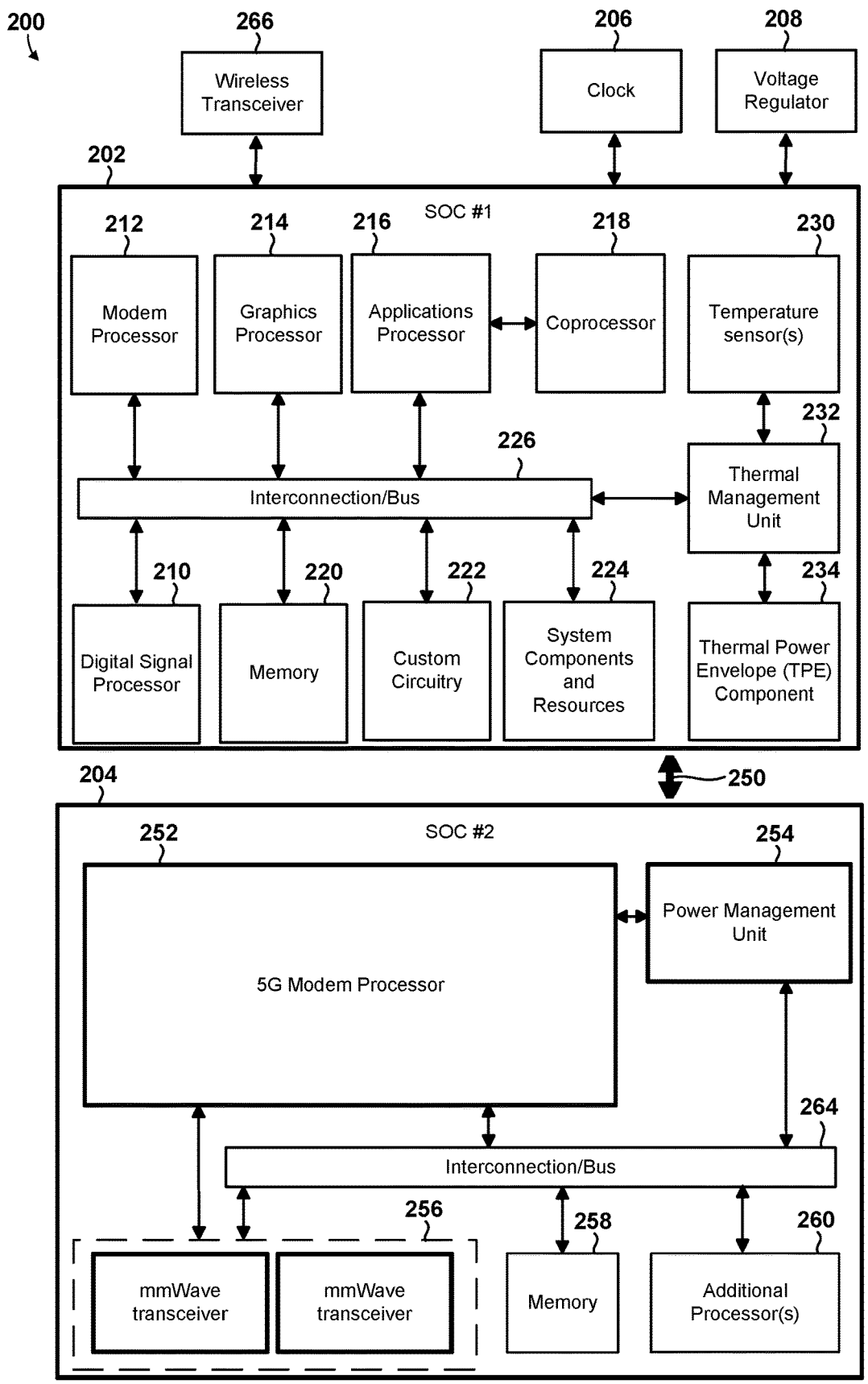
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1A-2, the illustrated example wireless device 200 (which may be a SIP in some embodiments) includes two SOCs 202, 204 coupled to a clock 206, a voltage regulator 208, and a wireless transceiver 266 configured to send and receive wireless communications via an antenna (not shown) to/from network wireless devices, such as a base station 110a. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuitry 222, system components and resources 224, an interconnection/ bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs). The interconnection/bus modules 226, 250, 264, individually and/or in various combinations, may be configured as AT interfaces to enable the processors 210, 212, 214, 216, 218, 252, 260 to exchange AT commands and/or responses with one another.

The first and/or second SOCs 202, 204 may further include an input/output module (not illustrated) for communicating with resources external to the SOC, such as a clock 206, a voltage regulator 208, and one or more wireless transceivers 266. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
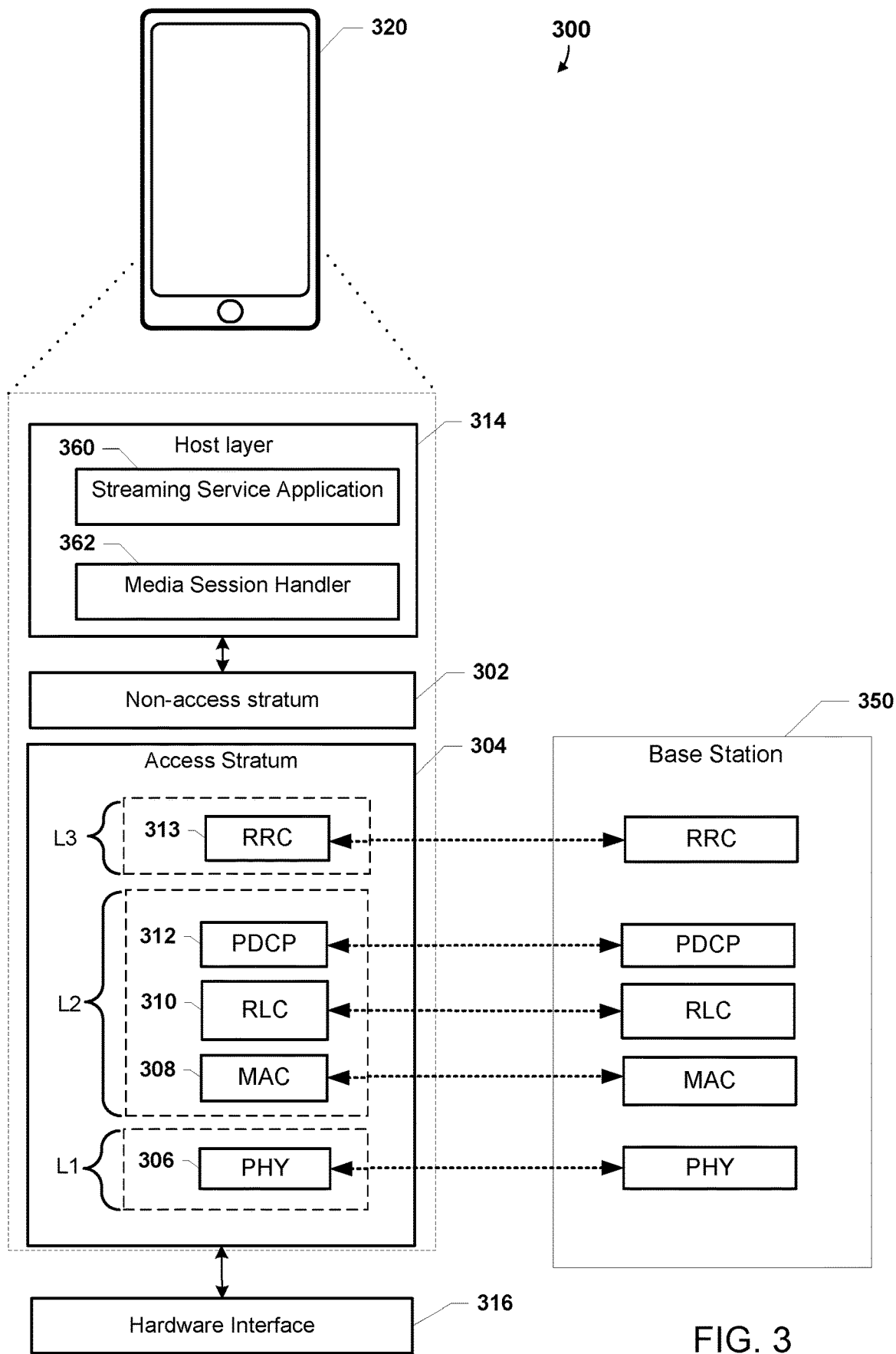
FIG. 3 is a diagram illustrating an example of a software architecture including a radio protocol stack for the user and control planes in wireless communications in accordance with various embodiments.

FIG. 3 illustrates an example of a software architecture 300 including a radio protocol stack for the user and Control planes in wireless communications between a base station 350 (e.g., the base station 110a-110d) and a wireless device 320 (e.g., the wireless device 120a-120e, 152, 154, 200). With reference to FIGS. 1A-3, the wireless device 320 may implement the software architecture 300 to communicate with the base station 350 of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security Management, Mobility Control, Session Management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported Access networks (e.g., a base station). In particular, the AS 304 may include at least three layers (Layer 1, Layer 2, and Layer 3), each of which may contain various sub-layers.

In the user and Control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and Control planes, Layer 2 (L2) of the AS 304 may be responsible for the link between the wireless device 320 and the base station 350 over the physical layer 306. In the various embodiments, Layer 2 may include a media Access Control (MAC) sublayer 308, a radio link Control (RLC) sublayer 310, and a packet data convergence protocol (PDCP) 312 sublayer, each of which form logical connections terminating at the base station 350.

In the Control plane, Layer 3 (L3) of the AS 304 may include a radio resource Control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the wireless device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random Access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor. As examples, the host layer 314 may provide various functions including streaming service application functions 360, such as downlink streaming service application functions and/or uplink streaming service application functions, media session handler functions 362, media player entities, media streamer entities, etc. Such streaming service application functions 360 and/or media handler functions 362 may operate together to provision streaming services (e.g., uplink streaming services, downlink streaming services, etc.) on the wireless device 320.

In other embodiments, the software architecture 300 may include one or more higher logical layer (e.g., transport, Session, presentation, application, etc.) that provide host layer functions. For example, in some embodiments, the software architecture 300 may include a network layer (e.g., IP layer) in which a logical connection terminates at an external packet data network (PDN) gateway (PGW) in a mobile operator's network. In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4A:
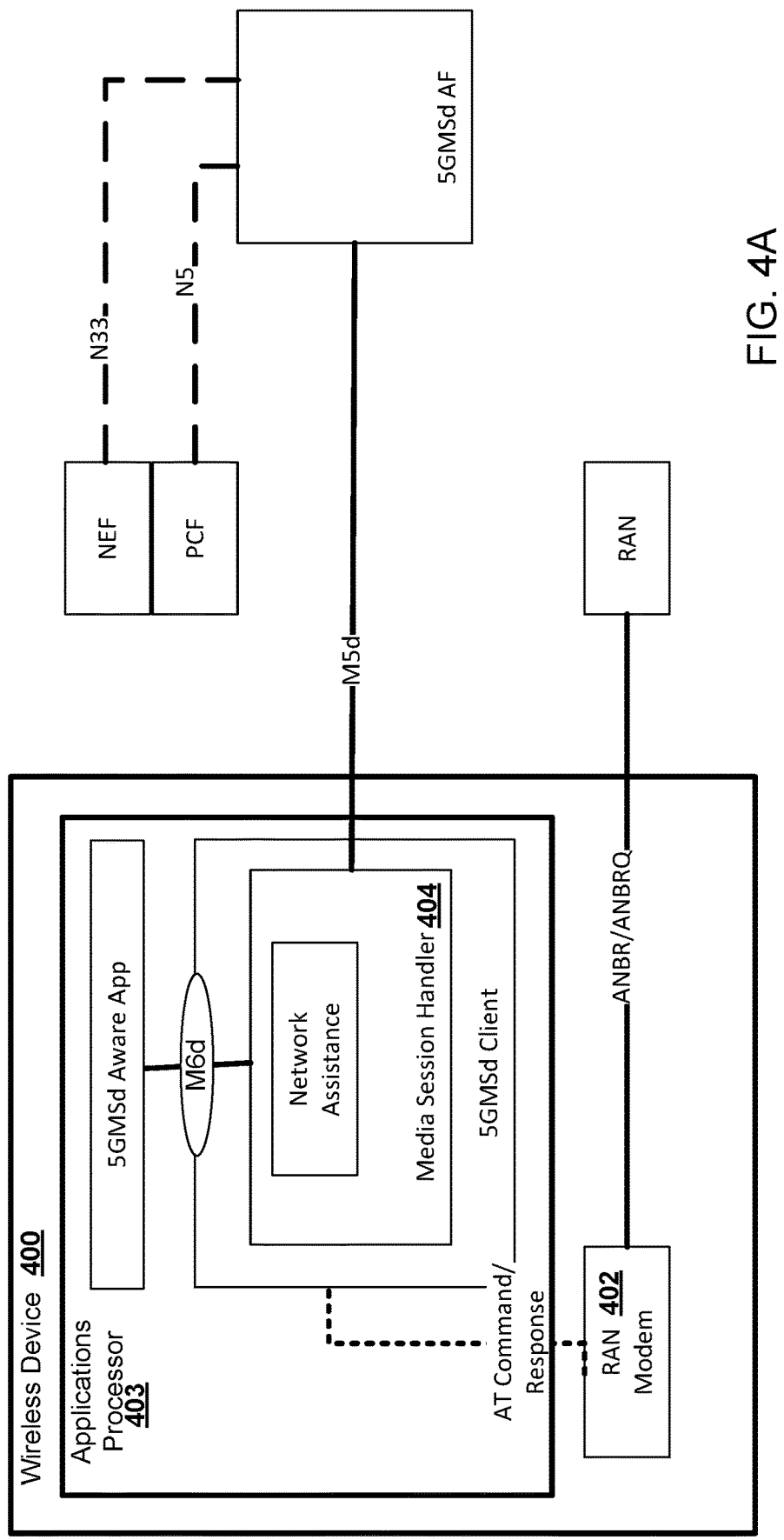
FIG. 4A is a component block diagram illustrating a system configured for providing downlink streaming service assistance in a 5GS network in accordance with various embodiments.
Figure 4B:
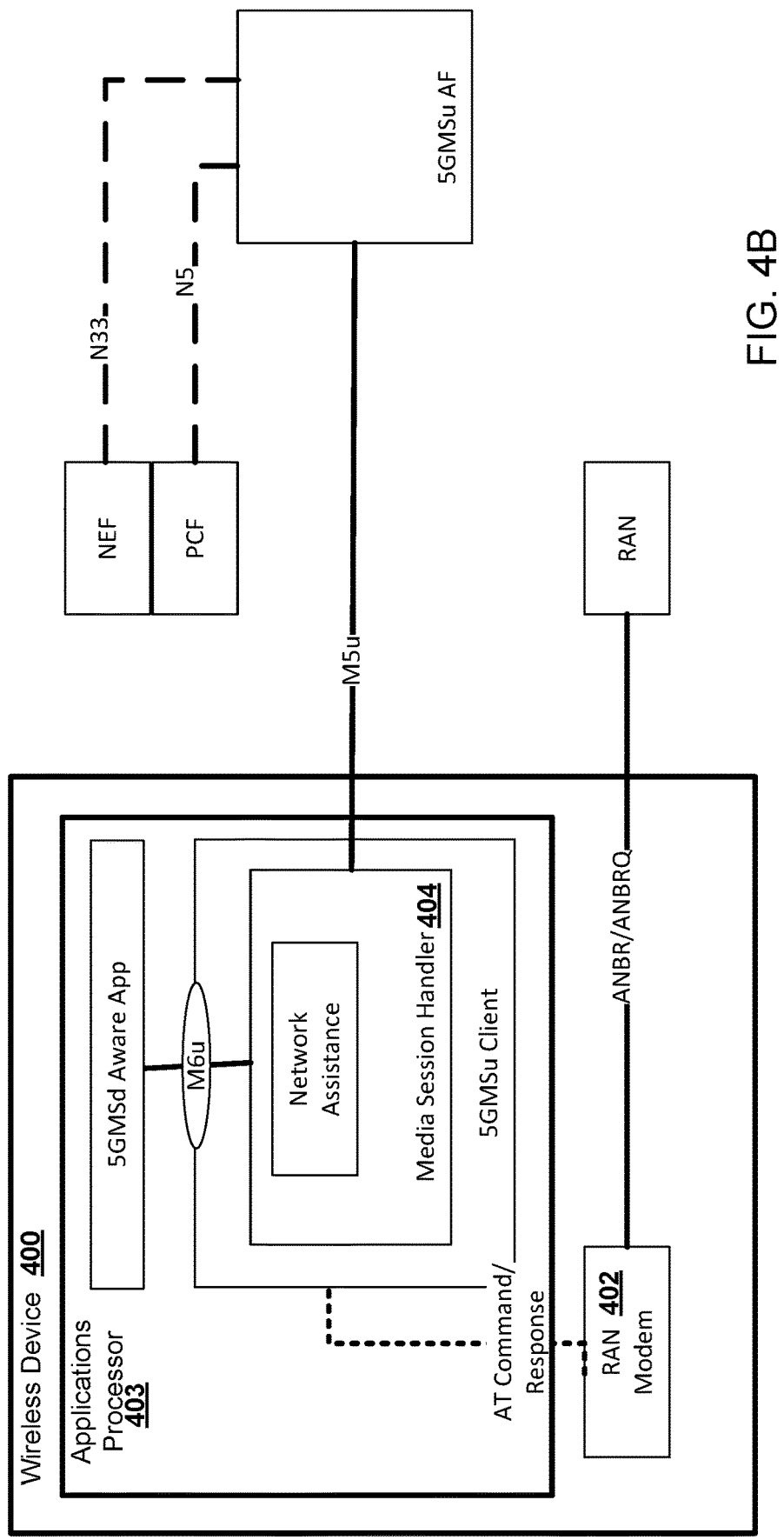
FIG. 4B is a component block diagram illustrating a system configured for providing uplink streaming service assistance in a 5GS network in accordance with various embodiments.

FIG. 4A is a component block diagram illustrating a system configured for providing downlink streaming service assistance in a 5GS network in accordance with various embodiments. FIG. 4B is a component block diagram illustrating the system of FIG. 4A providing uplink streaming service assistance in accordance with various embodiments. With reference to FIGS. 1A-4B, the system may include a wireless device 400 (e.g., the wireless device 120a-120e, 152, 154, 200, 320). The wireless device 400 may include a RAN modem 402 (e.g., modem processor 212, 252) connected to an applications processor 403 (e.g., applications processor 216). A media session handler 404 application may be running on the applications processor 403. The applications processor 403, and specifically the media session handler 404, may exchange AT commands/responses with the RAN modem 402. In various embodiments, the AT commands/responses exchanged between the applications processor 403 and RAN modem 402 may be AT commands/responses that are associated with downlink bitrate recommendation requests, responses, and/or notifications. In response to receiving an AT command that is a downlink bitrate recommendation request from the applications processor 403, such as from the media session handler 404 running on the applications processor 403, RAN modem 402 may send an ANBRQ message to a base station (e.g., the base station 110a-110d, 350) of a RAN (e.g., RAN 153). The RAN (e.g., RAN 153) may return a bitrate recommendation to the RAN modem 402 as an ANBR message. In response to receiving the ANBR message, the RAN modem 402 may send a response over an AT interface that is a downlink bitrate recommendation response to the applications processor 403, such as to the media session handler 404 running on the applications processor 403. The media session handler 404 may interface with a media player/streamer application and/or streaming aware application to provide the streaming service. For example, the media session handler 404 may interface with a media player/streamer application and/or streaming aware application to provide the streaming service via a M6 interface, such as a M6d interface for downlink media streaming and/or a M6u interface for uplink media streaming. While illustrated as running on the same processor (e.g., 403), the media player/streamer application and/or streaming aware application and/or media session handler 404 may be running on different processors of the wireless device 400 (e.g., the media player/streamer application on processor 218 and the media session handler 404 on processor 216, etc.).

In various embodiments, the AT commands/responses exchanged between the applications processor 403 and RAN modem 402 may be AT commands/responses that are associated with uplink bitrate recommendation requests, responses, and/or notifications. In response to receiving an AT command that is an uplink bitrate recommendation request from the applications processor 403, such as from the media session handler 404 running on the applications processor 403, RAN modem 402 may send an ANBRQ message to a base station (e.g., the base station 110a-110d, 350) of a RAN (e.g., RAN 153). The RAN (e.g., RAN 153) may return a bitrate recommendation to the RAN modem 402 as an ANBR message. In response to receiving the ANBR message, the RAN modem 402 may send a response over an AT interface that is an uplink bitrate recommendation response to the applications processor 403, such as to the media session handler 404 running on the applications processor 403.

Figure 5:
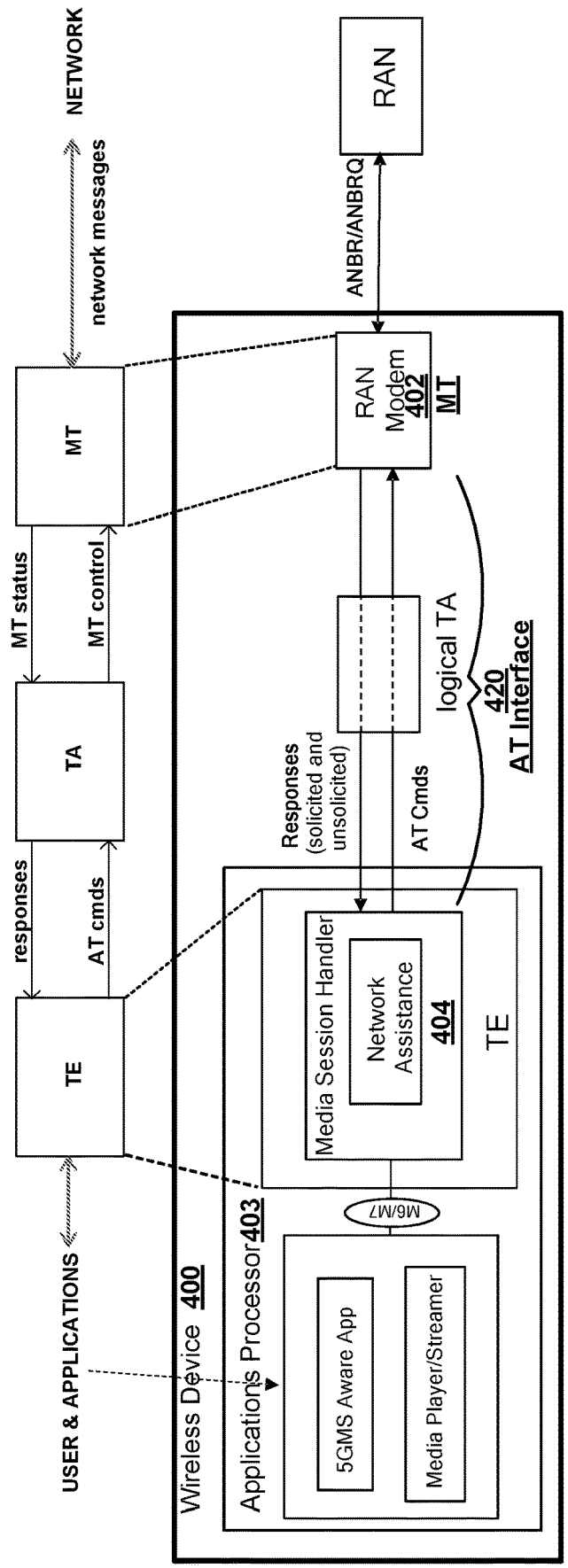
FIG. 5 illustrates an architecture for attention (AT) command/response exchange on a wireless device to support streaming service assistance in accordance with various embodiments.

FIG. 5 illustrates an architecture for AT command/response exchange on a wireless device 400 to support streaming service assistance in accordance with various embodiments. With reference to FIGS. 1A-5, a TE may be an application running on a first processor of the wireless device 400, such as a media session handler 404 running on the applications processor 403. A MT may be the RAN modem 402. The TE (e.g., media session handler 404) and MT (e.g., RAN modem 402) may exchange AT commands and responses via one or more logical Terminal Adaptors (TAs) between the TE (e.g., media session handler 404) and MT (e.g., RAN modem 402). The various one or more interconnections (e.g., interconnection/bus modules 226, 250, 264), including the one or more logical TAs, may operate as an AT interface 420 between the TE (e.g., media session handler 404) and MT (e.g., RAN modem 402). As a specific example, the media session handler 404 running on the applications processor 403 may send an AT command over the AT interface 420 associated with a bitrate recommendation request (e.g., a downlink bitrate request, uplink bitrate request, etc.). In this manner, the media session handler 404 may operate as a TE and the RAN modem 402 may operate as a MT. In response to receiving the AT command over the AT interface 420, the RAN modem 402 may send an ANBRQ message to a base station (e.g., the base station 110a-110d, 350) of a RAN (e.g., RAN 153). The base station (e.g., the base station 110a-110d, 350) of the RAN (e.g., RAN 153) may return a bitrate recommendation to the RAN modem 402 as an ANBR message. In response to receiving the ANBR message, the RAN modem 402 may send a response over the AT interface 420 that is a bitrate recommendation response (e.g., a downlink bitrate recommendation response, uplink bitrate recommendation response, etc.) to the media session handler 404 running on the applications processor 403.

Figure 6:
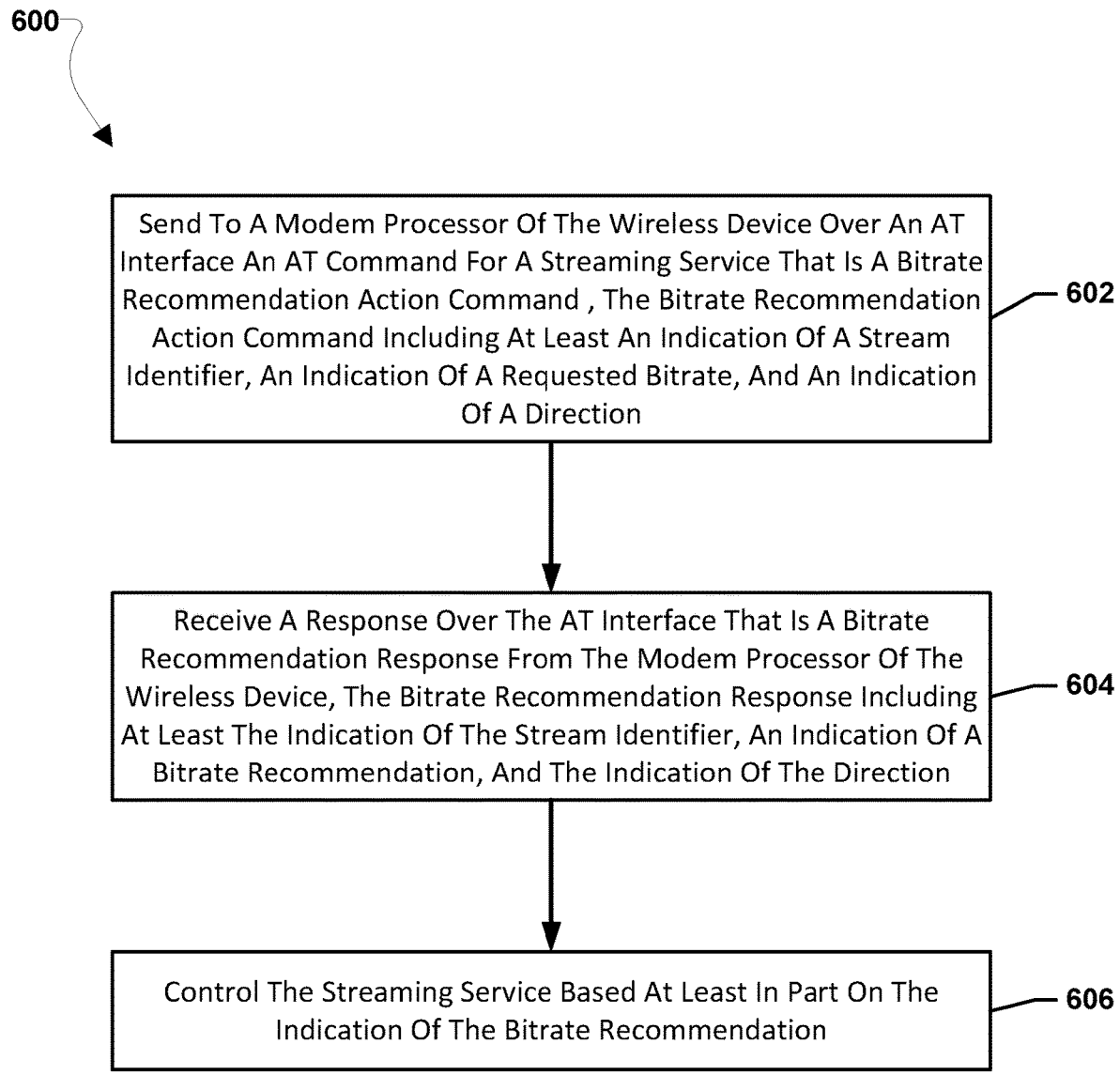
FIG. 6 is a process flow diagram illustrating a method performed by a processor of a wireless device for providing streaming service assistance in accordance with various embodiments.

FIG. 6 shows a process flow diagram of an example method 600 for providing streaming service assistance according to some embodiments. With reference to FIGS. 1A-6, the method 600 may be implemented by a processor (e.g., 216, 403) of a wireless device (e.g., the wireless device 120a-120e, 152, 154, 200, 320, 400). The operations of the method 600 may be performed to support uplink streaming and/or downlink streaming. In some embodiments, the processor implementing the operations of the method 600 may operate as a TE for purposes of AT command/response exchanges over an AT interface (e.g., 226, 250, 264, 420) with a modem processor (e.g., 212, 252, 402) of the wireless device that may operate as a MT.

In block 602, the processor may perform operations including sending to a modem processor of the wireless device over an AT interface an AT command that is a bitrate recommendation action command for a streaming service. The bitrate recommendation action command may include at least an indication of a stream identifier, an indication of a requested bitrate, and an indication of a direction. In some embodiments, the direction may be an indication of uplink or downlink. In some embodiments, the indication of the stream identifier may be an indication of an EPS bearer for the streaming service. In some embodiments, the indication of the stream identifier may be an indication of a PDU session for the streaming service. In some embodiments, the bitrate recommendation action command may further include an indication of a QoS flow of the PDU session for the streaming service.

In some embodiments, a bitrate request may be an AT command that is a bitrate recommendation action command including an indication of a stream identifier, such as an identifier of a PDU session, an identifier an EPS bearer, etc., an indication of a requested bitrate, such as an aggregate requested bitrate of the ensemble of QoS flows in a PDU session, a requested bitrate of an EPS bearer, a bitrate sum of a desired bitrate for a specific application data and/or specific QoS flow of interest (e.g., for which a boost or increased bitrate is requested) within a PDU session and bitrates of all other application data and/or QoS flows in that PDU session that are not of interest, etc., and an indication of a direction, such as UL, DL, etc. As a specific example, an AT command that is a bitrate recommendation action command may be "+CGBRR=<cid>,<reqBitrate>,<direction>". In this example, "<cid>" may be an integer type value specifying a stream identifier, such as a particular PDU session definition, "<reqBitrate>" may be an indication of a requested bitrate, such as an aggregate requested bitrate (e.g., in kilobit per second (kbit/s or kbps)) by a TE for the ensemble of QoS flows in the PDU session referenced by "<cid>" to be responded by a MT, and "<direction>" may be an indication of a direction, such as "UL" or "DL" of the bitrate request.

In some embodiments, an AT command that is a bitrate recommendation action command may further include an indication of a particular QoS flow within a PDU session. As a specific example, an AT command that is a bitrate recommendation action command including an indication of a particular QoS flow within a PDU session may be "+CGBRR=<cid>,<reqBitrate>,<direction>,[<p_cid>]". In this example, "<cid>" may be an integer type value specifying a stream identifier, such as a particular PDU session definition "<reqBitrate>" may be an indication of a requested bitrate, such as an aggregate requested bitrate (e.g., in kilobit per second (kbit/s or kbps)) by a TE for the ensemble of QoS flows in the PDU session referenced by "<cid>" to be responded by a MT, "<direction>" may be an indication of a direction, such as "UL" or "DL" of the bitrate request, and "<p_cid>" may be an integer type value specifying a particular QoS flow within the PDU session referenced by "<cid>". The aggregate requested bitrate, such as <reqBitrate>, may represent a bitrate sum of a desired bitrate for a specific application data and/or specific QoS flow of interest, such as the QoS flow specified by <p_cid> (e.g., for which a boost or increased bitrate is requested), within a PDU session and bitrates of all other application data and/or QoS flows in that PDU session that are not of interest.

In block 604, the processor may perform operations including receiving a response over the AT interface that is a bitrate recommendation response from the modem processor of the wireless device, the bitrate recommendation response including at least the indication of the stream identifier, an indication of a bitrate recommendation, and the indication of the direction. In various embodiments, the bitrate recommendation response may further include the indication of the QoS flow of the PDU session for the streaming service.

In some embodiments, a bitrate response may be a response that is a bitrate recommendation response including an indication of a stream identifier, such as an identifier of a PDU session, an identifier an EPS bearer, etc., an indication of a bitrate recommendation, such as an aggregate bitrate recommendation for streaming operation of the ensemble of QoS flows in a PDU session, a bitrate recommendation for streaming operation of an EPS bearer, etc., and an indication of a direction, such as UL, DL, etc. As a specific example, a response over the AT interface that is a bitrate recommendation response may be "+CGBRR=<cid>, <recmBitrate>,<direction>". In this example, "<cid>" may be an integer type value specifying a stream identifier, such as a particular PDU session definition, "<recmBitrate>" may be an indication of a bitrate recommendation, such as an aggregate bitrate recommendation (e.g., in kbit/s) sent from a MT to a TE for streaming operation for the ensemble of QoS flows in the PDU session referenced by "<cid>", and "<direction>" may be an indication of a direction, such as "UL" or "DL" of the bitrate response.

In some embodiments, a response that is a bitrate recommendation response may further include an indication of a particular QoS flow within a PDU session. As a specific example, a response that is a bitrate recommendation response including an indication of a particular QoS flow within a PDU session may be "+CGBRR=<cid>,<recmBitrate>,<direction>[,<p_cid>]". In this example, "<cid>" may be an integer type value specifying a stream identifier, such as a particular PDU session definition, and "<recmBitrate>" may be an indication of a bitrate recommendation, such as an aggregate bitrate recommendation (e.g., in kbit/s) sent from a MT to a TE for streaming operation for the ensemble of QoS flows in the PDU session referenced by "<cid>." Also in this example, "<direction>" may be an indication of a direction, such as "UL" or "DL" of the bitrate response, and "<p_cid>" may be an integer type value specifying a particular QoS flow within the PDU session referenced by "<cid>". In some embodiments, a response that is a bitrate recommendation response may be sent from a MT to a TE in response to the TE sending an AT command that is a bitrate recommendation action command to the MT.

In block 606, the processor may perform operations including controlling the streaming service based at least in part on the indication of the bitrate recommendation. For example, the processor may increase and/or decrease the streaming rate of the steaming service based on the bitrate recommendation. In various embodiments, controlling the streaming service based at least in part on the indication of the bitrate recommendation may include converting the indication of the bitrate recommendation to an application level bitrate value and controlling the streaming service based at least in part on the application level bitrate value. In some embodiments, a media session handler may perform the conversion/mapping between MAC and application level bitrate values. For example, the media session handler may obtain information from the modem of any additional QoS flows (contending for the RAN bitrate expressed by ANBR) and their bitrate requirements, and upper layer transport overheads, and information from a Media Player (in case of DL streaming) of the operation points of other application flows sent in the same PDU session to support the conversion/mapping between MAC and application level bitrate values.

In some embodiments, controlling the streaming service based at least in part on the indication of the bitrate recommendation in block 606 may include deriving the bitrate increase (or boost) for a QFI or QoS flow of interest (e.g., for which a boost or increased bitrate was requested) from the bitrate recommendation in the response received over the AT interface from the modem processor of the wireless device. The bitrate recommendation received from the modem processor, such as the "<recmBitrate>" may be an indication of an aggregate bitrate recommendation (e.g., in kbit/s) for the ensemble of QoS flows in a PDU session, such as the PDU session referenced by "<cid>". The recommended bitrate (e.g., the boosted or increased bitrate) for the specific application data and/or specific QoS flow of interest, such as the QoS flow specified by <p_cid> (e.g., for which a boost or increased bitrate was requested), may be determined by subtracting the sum of bitrates of all other application data and/or QoS flows in that PDU session that are not of interest from the aggregate bitrate recommendation received from the modem processor, such as the "<recmBitrate>" that may be an indication of an aggregate bitrate recommendation for the ensemble of QoS flows in the PDU session.

Figure 7:
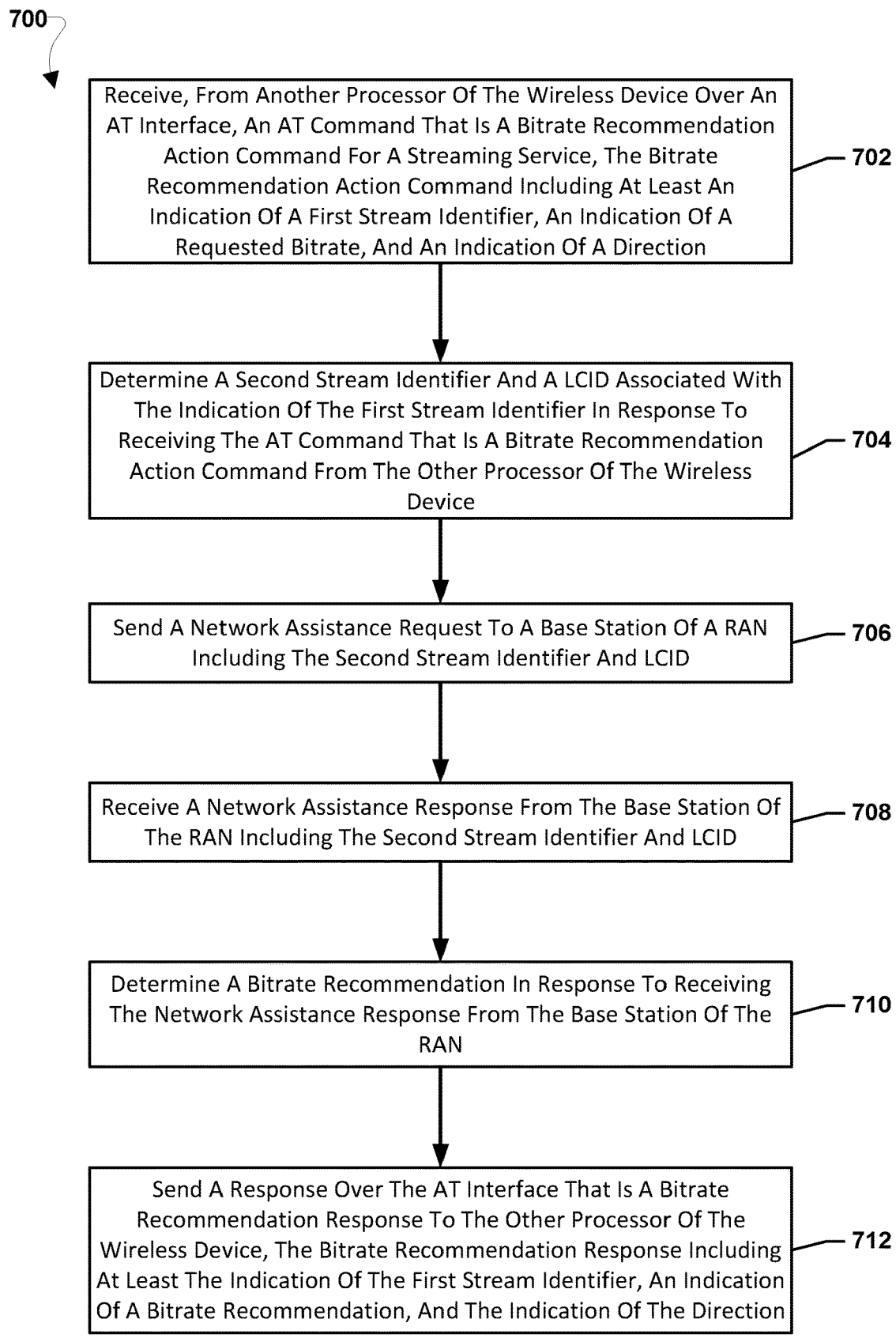
FIG. 7 is a process flow diagram illustrating a method performed by a modem processor of a wireless device for providing streaming service assistance in accordance with various embodiments.

FIG. 7 is a process flow diagram illustrating a method 700 performed by a modem processor of a wireless device for providing streaming service assistance in accordance with some embodiments. With reference to FIGS. 1A-7, the method 700 may be implemented by a modem processor (e.g., 212, 252, 402) of a wireless device (e.g., the wireless device 120a-120e, 152, 154, 200, 320, 400). The operations of the method 700 may be performed to support uplink streaming and/or downlink streaming. The operations of the method 700 may be performed in conjunction with the operations of the method 600 (FIG. 6). In some embodiments, the modem processor implementing the operations of the method 700 may operate as a MT for purposes of AT command/response exchanges over an AT interface (e.g., 226, 250, 264, 420) with another processor (e.g., 216, 403) of the wireless device that may operate as a TE.

In block 702, the modem processor may perform operations including receiving from another processor of the wireless device over an AT interface an AT command that is a bitrate recommendation action command for a streaming service, the bitrate recommendation action command including at least an indication of a first stream identifier, an indication of a requested bitrate, and an indication of a direction. In some embodiments, the direction may be an indication of uplink or downlink. In some embodiments, the indication of the first stream identifier may be an indication of an EPS bearer for the streaming service. In some embodiments, the indication of the first stream identifier may be an indication of a PDU session for the streaming service. In some embodiments, the bitrate recommendation action command may further include an indication of a QoS flow of the PDU session for the streaming service.

In some embodiments, a bitrate request may be an AT command that is a bitrate recommendation action command including an indication of a first stream identifier, such as an identifier of a PDU session, an identifier an EPS bearer, etc., an indication of a requested bitrate, such as an aggregate requested bitrate of the ensemble of QoS flows in a PDU session, a requested bitrate of an EPS bearer, a bitrate sum of a desired bitrate for a specific application data and/or specific QoS flow of interest (e.g., for which a boost or increased bitrate is requested) within a PDU session and bitrates of all other application data and/or QoS flows in that PDU session that are not of interest, etc., and an indication of a direction, such as UL, DL, etc. As a specific example, an AT command that is a bitrate recommendation action command may be "+CGBRR=<cid>,<reqBitrate>,<direction>". In this example, "<cid>" may be an integer type value specifying a first stream identifier, such as a particular PDU session definition, "<reqBitrate>" may be an indication of a requested bitrate, such as an aggregate requested bitrate (e.g., in kilobit per second (kbit/s or kbps)) by a TE for the ensemble of QoS flows in the PDU session referenced by "<cid>" to be responded by a MT, and "<direction>" may be an indication of a direction, such as "UL" or "DL" of the bitrate request.

In some embodiments, an AT command that is a bitrate recommendation action command may further include an indication of a particular QoS flow within a PDU session. As a specific example, an AT command that is a bitrate recommendation action command including an indication of a particular QoS flow within a PDU session may be "+CGBRR=<cid>,<reqBitrate>,<direction>,[<p_cid>]". In this example, "<cid>" may be an integer type value specifying a first stream identifier, such as a particular PDU session definition "<reqBitrate>" may be an indication of a requested bitrate, such as an aggregate requested bitrate (e.g., in kilobit per second (kbit/s or kbps)) by a TE for the ensemble of QoS flows in the PDU session referenced by "<cid>" to be responded by a MT. Also in this example, "<direction>" may be an indication of a direction, such as "UL" or "DL" of the bitrate request, and "<p_cid>" may be an integer type value specifying a particular QoS flow within the PDU session referenced by "<cid>". The aggregate requested bitrate, such as <reqBitrate>, may represent a bitrate sum of a desired bitrate for a specific application data and/or specific QoS flow of interest, such as the QoS flow specified by <p_cid> (e.g., for which a boost or increased bitrate is requested), within a PDU session and bitrates of all other application data and/or QoS flows in that PDU session that are not of interest.

In block 704, the modem processor may perform operations including determining a second stream identifier and a LCID associated with the indication of the first stream identifier in response to receiving the AT command that is a bitrate recommendation action command from the other processor of the wireless device. In various embodiments, streams, such as QoS flows, EPS bearers, etc., may map to RAN Layer 2 (L2) parameters. In various embodiments, a TE (e.g., an application running on a processor of a wireless device, such as a media session handler, etc.) may indicate to a modem processor of the wireless device (e.g., a 5G modem, LTE modem, etc.), the stream (e.g., the QoS flow, EPS bearer, etc.) corresponding to the media streaming application flow for which bitrate recommendation, or boost, is sought. As an example, an application may identify to the modem the QoS Flow (for example, by the QFI of the QoS Flow) corresponding to be media streaming application flow for which bitrate recommendation or boost is sought, the associated PDU session identifier, and the requested streaming bitrate, using the action/execute command "+CGBRR=<cid>,<reqBitrate>,<direction>[,<p_cid>]". In various embodiments, the modem processor receiving a bitrate recommendation action command may map the first stream identifier (e.g., the value of "<cid>") to an internally referenced PDU session and associated LCID in a Recommended Bit Rate MAC CE that is used in bitrate recommendation query/response/notification interaction with the RAN (e.g., map the first stream identifier to the second stream identifier of the internally referenced PDU session). In various embodiments, upon wireless device establishment of a PDU session with a Session Management Function (SMF) via Non-Access Stratum (NAS) signaling, the SMF may return authorized QoS rules for use by the wireless device. In some embodiments, the SMF may also assign, for each QoS flow in the PDU session, an associated QFI and QoS profile which may be provided to a base station the wireless device is camped on, such as an eNB, gNB, etc., via an Access and Mobility management Function (AMF). As there may be a one-to-one correspondence between RAN L2 parameters for LCID, Data Radio Bearer (DRB) identifier (DRB ID), QFI, and Radio Resource Control (RRC) parameters define radio bearer and corresponding Service Data Adaption Protocol (SDAP) (e.g., for NR only), Packet Data Convergence Protocol (PDCP), Radio Link Control (RLC), and MAC configuration, a base station the wireless device is camped on, such as a eNB, gNB, etc., may be able to unambiguously map the PDU session and its contained QoS flow(s) for bitrate recommendation treatment to a DRB.

In block 706, the modem processor may perform operations including sending a network assistance request to a base station of a RAN including the second stream identifier and LCID. As specific examples, a network assistance request may be an ANBRQ message, a Recommended Bit Rate Query MAC CE, etc.

In block 708, the modem processor may perform operations including receiving a network assistance response from the base station of the RAN including the second stream identifier and LCID. As specific examples, a network assistance response may be an ANBR message, a Recommended Bit Rate MAC CE, etc.

In block 710, the modem processor may perform operations including determining a bitrate recommendation in response to receiving the network assistance response from the base station of the RAN. In various embodiments, the bitrate recommendation may be determined to be the same as a bitrate recommendation in the network assistance response. In various embodiments, determining the bitrate recommendation in response to receiving the network assistance response from the base station of the RAN may include converting a bitrate recommendation indicated in the network assistance response from the base station of the RAN to an application level bitrate value.

In block 712, the modem processor may perform operations including sending a response over the AT interface that is a bitrate recommendation response to the other processor of the wireless device, the bitrate recommendation response including at least the indication of the first stream identifier, an indication of the bitrate recommendation, and the indication of the direction. In various embodiments, the bitrate recommendation response further includes the indication of the QoS flow of the PDU session for the streaming service.

In some embodiments, a bitrate response may be a response over the AT interface that is a bitrate recommendation response including an indication of a first stream identifier, such as an identifier of a PDU session, an identifier of an EPS bearer, etc., an indication of a bitrate recommendation, such as an aggregate bitrate recommendation for streaming operation of the ensemble of QoS flows in a PDU session, a bitrate recommendation for streaming operation of an EPS bearer, etc., and an indication of a direction, such as UL, DL, etc. As a specific example, a response that is a bitrate recommendation response may be "+CGBRR=<cid>,<recmBitrate>,<direction>". In this example, "<cid>" may be an integer type value specifying a first stream identifier, such as a particular PDU session definition, "<recmBitrate>" may be an indication of a bitrate recommendation, such as an aggregate bitrate recommendation (e.g., in kbit/s) sent from a MT to a TE for streaming operation for the ensemble of QoS flows in the PDU session referenced by "<cid>", and "<direction>" may be an indication of a direction, such as "UL" or "DL" of the bitrate response.

In some embodiments, a response that is a bitrate recommendation response may further include an indication of a particular QoS flow within a PDU session. As a specific example, a response that is a bitrate recommendation response including an indication of a particular QoS flow within a PDU session may be "+CGBRR=<cid>,<recmBitrate>,<direction>[,<p_cid>]". In this example, "<cid>" may be an integer type value specifying a first stream identifier, such as a particular PDU session definition, and "<recmBitrate>" may be an indication of a bitrate recommendation, such as an aggregate bitrate recommendation (e.g., in kbit/s) sent from a MT to a TE for streaming operation for the ensemble of QoS flows in the PDU session referenced by "<cid>." Also in this example, "<direction>" may be an indication of a direction, such as "UL" or "DL" of the bitrate response, and "<p_cid>" may be an integer type value specifying a particular QoS flow within the PDU session referenced by "<cid>". In some embodiments, a response that is a bitrate recommendation response may be sent from a MT to a TE in response to the TE sending an AT command that is a bitrate recommendation action command to the MT.

Figure 8A:
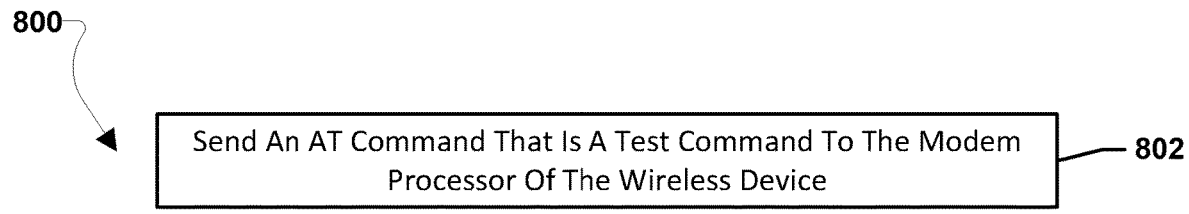
FIG. 8A is a process flow diagram illustrating a method performed by a processor of a wireless device for providing streaming service assistance in accordance with various embodiments.

FIG. 8A is a process flow diagram illustrating a method 800 performed by a processor of a wireless device for providing streaming service assistance in accordance with some embodiments. With reference to FIGS. 1A-8A, the method 800 may be implemented by a processor (e.g., 216, 403) of a wireless device (e.g., the wireless device 120a-120e, 152, 154, 200, 320, 400). The operations of the method 800 may be performed to support uplink streaming and/or downlink streaming. The operations of the method 800 may be performed in conjunction with the operations of the method 600 (FIG. 6) and/or 700 (FIG. 7). The processor implementing the operations of the method 800 may operate as a TE for purposes of AT command/response exchanges over an AT interface (e.g., 226, 250, 264, 420) with a modem processor (e.g., 212, 252, 402) of the wireless device that may operate as a MT.

In block 802, the processor may perform operations including sending an AT command that is a test command to the modem processor of the wireless device. The AT command that is a test command may be sent to the modem processor of the wireless device over an AT interface. In some embodiments, a test command may be sent from a TE to a MT to determine whether or not the MT supports sending an AT command that is a bitrate recommendation response to an AT command that is a bitrate recommendation action command. As a specific example, a TE may send a test command "+CGBRR=?" to a MT as a query as to whether or not the MT supports sending an AT command that is a bitrate recommendation response to an AT command that is a bitrate recommendation action command.

Figure 8B:
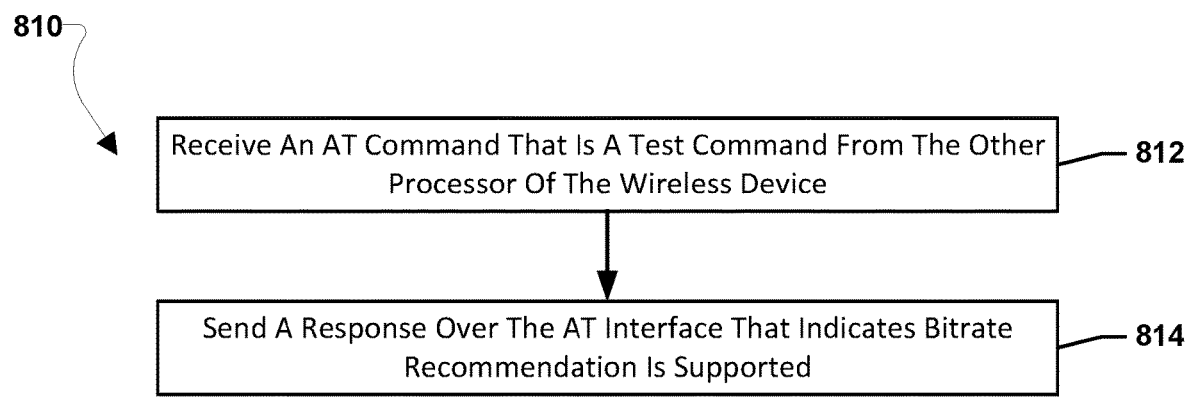
FIG. 8B is a process flow diagram illustrating a method performed by a modem processor of a wireless device for providing streaming service assistance in accordance with various embodiments.

FIG. 8B is a process flow diagram illustrating a method 810 performed by a modem processor of a wireless device for providing streaming service assistance in accordance with some embodiments. With reference to FIGS. 1A-8B, the method 810 may be implemented by a modem processor (e.g., 212, 252, 402) of a wireless device (e.g., the wireless device 120a-120e, 152, 154, 200, 320, 400). The operations of the method 810 may be performed to support uplink streaming and/or downlink streaming. In some embodiments, the operations of the method 810 may be performed in conjunction with the operations of the method 600 (FIG. 6), 700 (FIG. 7), and/or 800 (FIG. 8A). In some embodiments, the modem processor implementing the operations of the method 810 may operate as a MT for purposes of AT command/response exchanges over an AT interface (e.g., 226, 250, 264, 420) with another processor (e.g., 216, 403) of the wireless device that may operate as a TE.

In block 812, the modem processor may perform operations including receiving an AT command that is a test command from the other processor of the wireless device. In some embodiments, a test command may be sent from a TE to a MT to determine whether or not the MT supports sending an AT command that is a bitrate recommendation response to an AT command that is a bitrate recommendation action command. As a specific example, a TE may send a test command "+CGBRR=?" to a MT as a query as to whether or not the MT supports sending an AT command that is a bitrate recommendation response to an AT command that is a bitrate recommendation action command.

In block 814, the modem processor may perform operations including sending a response over the AT interface that indicates bitrate recommendation is supported. In some embodiments, a MT supporting sending a response that is a bitrate recommendation response to an AT command that is a bitrate recommendation action command may respond to a test code with a supported response. As a specific example, a MT may send a supported response of "+CGBRR=OK" to a TE in response to a test command "+CGBRR=?" thereby indicating the MT supports sending a response that is a bitrate recommendation response to an AT command that is a bitrate recommendation action command.

Figure 9A:
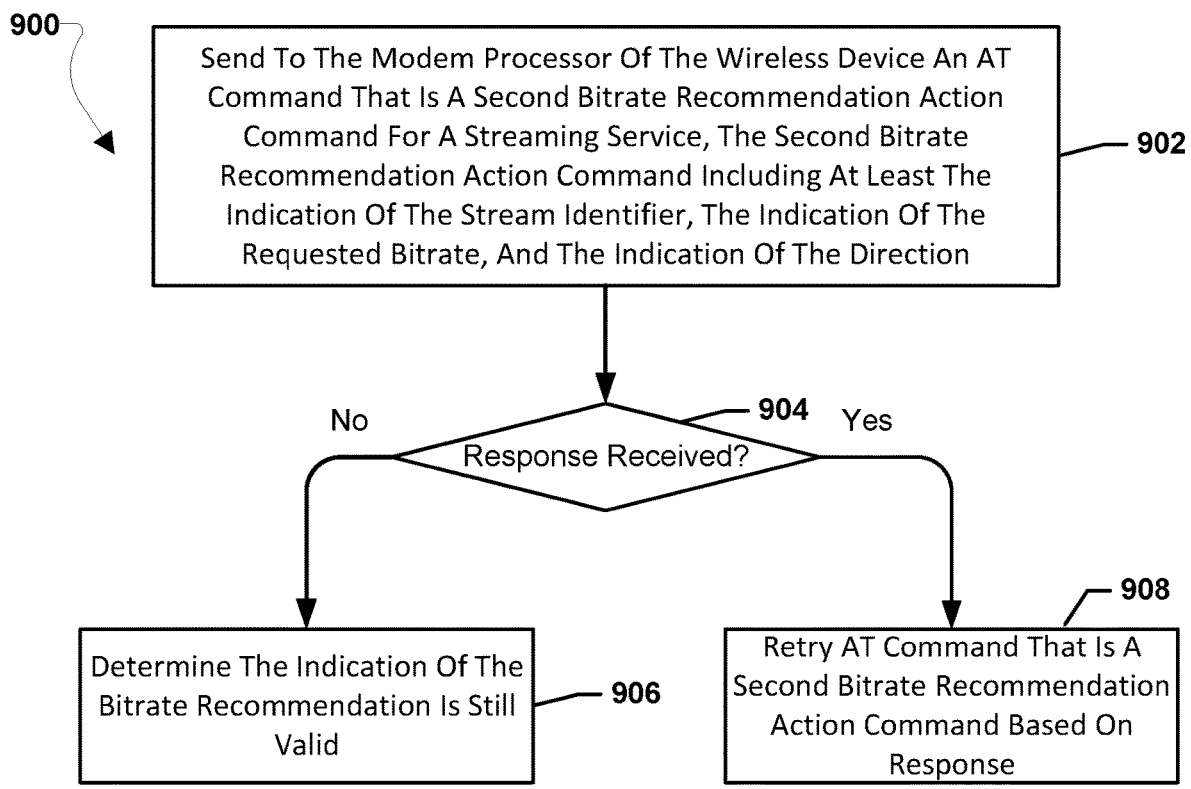
FIG. 9A is a process flow diagram illustrating a method performed by a processor of a wireless device for providing streaming service assistance in accordance with various embodiments.

FIG. 9A is a process flow diagram illustrating a method 900 performed by a processor of a wireless device for providing streaming service assistance in accordance with some embodiments. With reference to FIGS. 1A-9A, the method 600 may be implemented by a processor (e.g., 216, 403) of a wireless device (e.g., the wireless device 120a-120e, 152, 154, 200, 320, 400). The operations of the method 900 may be performed to support uplink streaming and/or downlink streaming. In some embodiments, the operations of the method 900 may be performed in conjunction with the operations of the method 600 (FIG. 6), 700 (FIG. 7), 800 (FIG. 8A), and/or 810 (FIG. 8B). In some embodiments, the operations of the method 900 may be performed after sending the initial AT command that is a second bitrate recommendation action command in block 602 of method 600 (FIG. 6). In some embodiments, the processor implementing the operations of the method 900 may operate as a TE for purposes of AT command/response exchanges over an AT interface (e.g., 226, 250, 264, 420) with a modem processor (e.g., 212, 252, 402) of the wireless device that may operate as a MT.

In block 902, the processor may perform operations including sending to the modem processor of the wireless device an AT command that is a second bitrate recommendation action command for a streaming service, the second bitrate recommendation action command including at least the indication of the stream identifier, the indication of the requested bitrate, and the indication of the direction. The AT command that is a second bitrate recommendation action command for a streaming service may be sent to the modem processor of the wireless device over an AT interface.

In determination block 904, the processor may determine whether a response is received, such as whether a response is received via the AT interface. For example, the processor may determine whether a response that is an error message is received over the AT interface from the modem processor of the wireless device or a response that is a second bitrate recommendation response is received over the AT interface from the modem processor of the wireless device.

In response to determining that a response over the AT interface is not received (i.e., determination block 906="No"), the processor may determine that the indication of the bitrate recommendation is still valid in block 906. In various embodiments, a lack of a response to the AT command that is the second bitrate recommendation action command from the modem processor indicates the indication of the bitrate recommendation is still valid.

In response to determining that a response over the AT interface is received (i.e., determination block 906="Yes"), the processor may retry the AT command that is the second bitrate recommendation action command based on the response in block 908. Retrying the AT command that is the second bitrate recommendation action command based on the response may include sending the AT command that is the second bitrate recommendation action command again after a retry-after time period indicated in the response from the modem processor expires. Retrying the AT command that is the second bitrate recommendation action command based on the response may include sending the AT command that is the second bitrate recommendation action command again when an indication of a time at which a network assistance response associated with the indication of the bitrate recommendation was received by the modem processor is longer than a threshold.

Figure 9B:
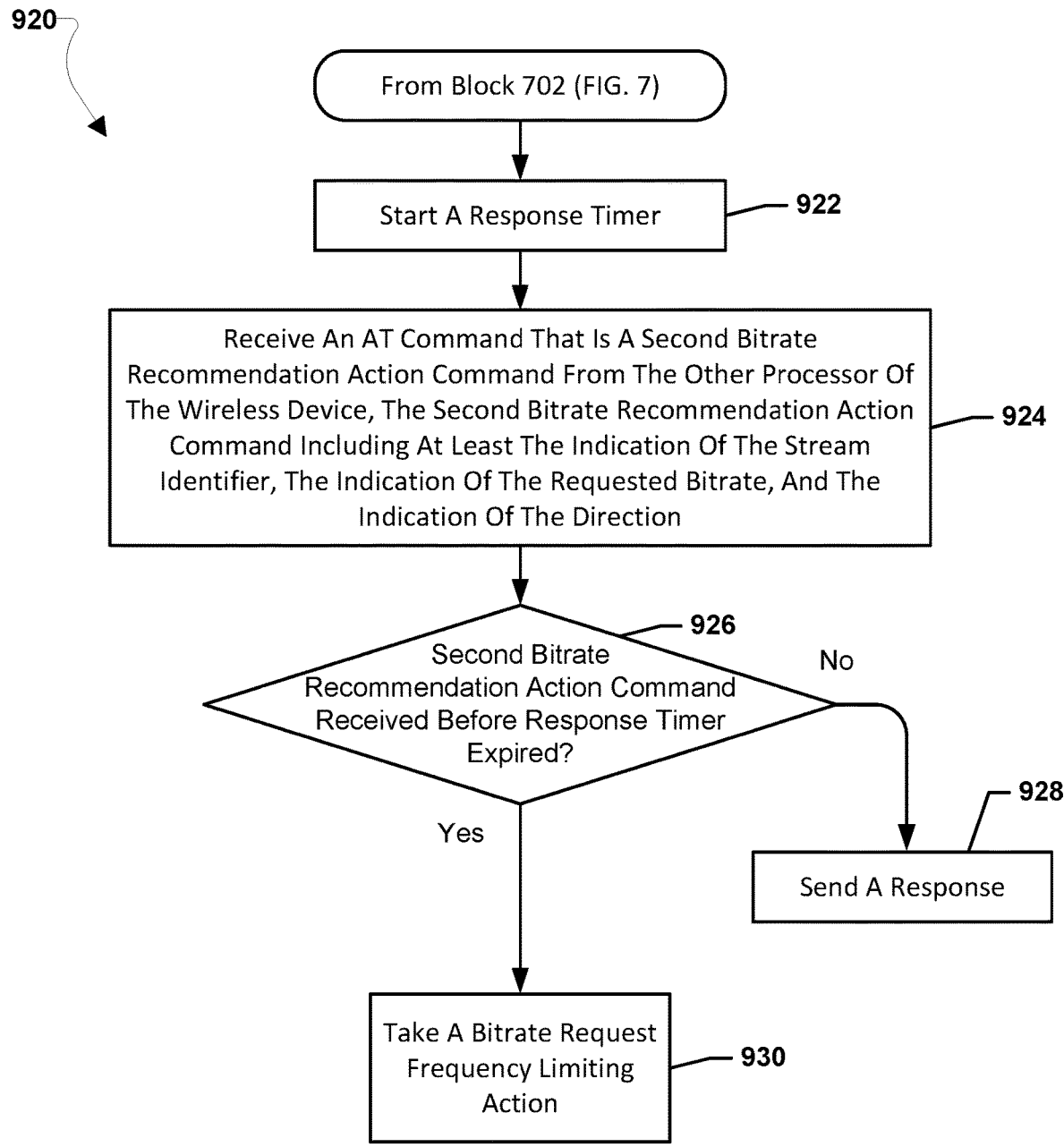
FIG. 9B is a process flow diagram illustrating a method performed by a modem processor of a wireless device for providing streaming service assistance in accordance with various embodiments.

FIG. 9B is a process flow diagram illustrating a method 920 performed by a modem processor of a wireless device for providing streaming service assistance in accordance with various embodiments. With reference to FIGS. 1A-9B, the method 920 may be implemented by a modem processor (e.g., 212, 252, 402) of a wireless device (e.g., the wireless device 120a-120e, 152, 154, 200, 320, 400). The operations of method 920 may be performed to support uplink streaming and/or downlink streaming. In various embodiments, the operations of method 920 may be performed in conjunction with the operations of method 600 (FIG. 6), 700 (FIG. 7), 800 (FIG. 8A), 810 (FIG. 8B), and/or 900 (FIG. 9A). In various embodiments, the operations of method 920 may be performed in response to receiving the AT command that is the bitrate recommendation action command from the other processor of the wireless device in block 702 (FIG. 7). In various embodiments, the modem processor implementing the operations of method 920 may operate as a MT for purposes of AT command/response exchanges over an AT interface (e.g., 226, 250, 264, 420) with another processor (e.g., 216, 403) of the wireless device that may operate as a TE.

In block 922, the modem processor may perform operations including starting a response timer. In some embodiments, a response timer may control the response of a MT to bitrate recommendation action commands from a TE. As an example, the same limit of the frequency of ANBRQ messages as set in the "bitRateQueryProhibitTimer" field in the "LogicalChannelConfig" IE may be applied to control the MT's response to bitrate requests from a TE.

In block 924, the modem processor may perform operations including receiving an AT command that is a second bitrate recommendation action command from the other processor of the wireless device, the second bitrate recommendation action command including at least the indication of the stream identifier, the indication of the requested bitrate, and the indication of the direction. The AT command that is a second bitrate recommendation action command may be received over an AT interface from the other processor of the wireless device.

In determination block 926, the modem processor may perform operations including determining whether the second bitrate recommendation action command is received before the response timer expired.

In response to determining the second bitrate recommendation action command is received after the response timer expired (i.e., determination block 926="No"), the modem processor may send a response in block 928. The response may be sent over the AT interface. As the response timer expired, the request and response may be a desired frequency setting for bitrate requests.

In response to determining the second bitrate recommendation action command is received before the response timer expired (i.e., determination block 926="Yes"), the modem processor may take a bitrate request frequency limiting action in block 930. In an embodiment, in response to a TE sending a successive bitrate recommendation action command before the response timer has expired, the MT may return an error code, such as an error code indicating the latest bitrate recommendation action command was sent prematurely. In some embodiments, the error code may include a "retry-after" parameter. In some embodiments, the error code may be sent by the modem processor over the AT interface. In an embodiment, in response to a TE sending a successive bitrate recommendation action command before the response timer has expired, the MT may return the latest bitrate recommendation applicable to the stream identifier, such as an identifier of a PDU session, an identifier an EPS bearer, etc., indicated in the latest bitrate recommendation action command. In some embodiments, the latest bitrate recommendation sent by the MT may include an indication a wall-clock time at which a network assistance response, such as an ANBR message, etc., was received from the RAN that corresponded to the latest bitrate recommendation. In some embodiments, the latest bitrate recommendation may be sent by the modem processor in a response over the AT interface. In some embodiments, in response to a TE sending a successive bitrate recommendation action command before the response timer has expired, the MT may take no action. In some embodiments, a TE may be configured to interpret the absence of a response from a MT to a bitrate recommendation action command as an indication that a last bitrate recommendation sent by the MT is still valid.

Figure 9C:
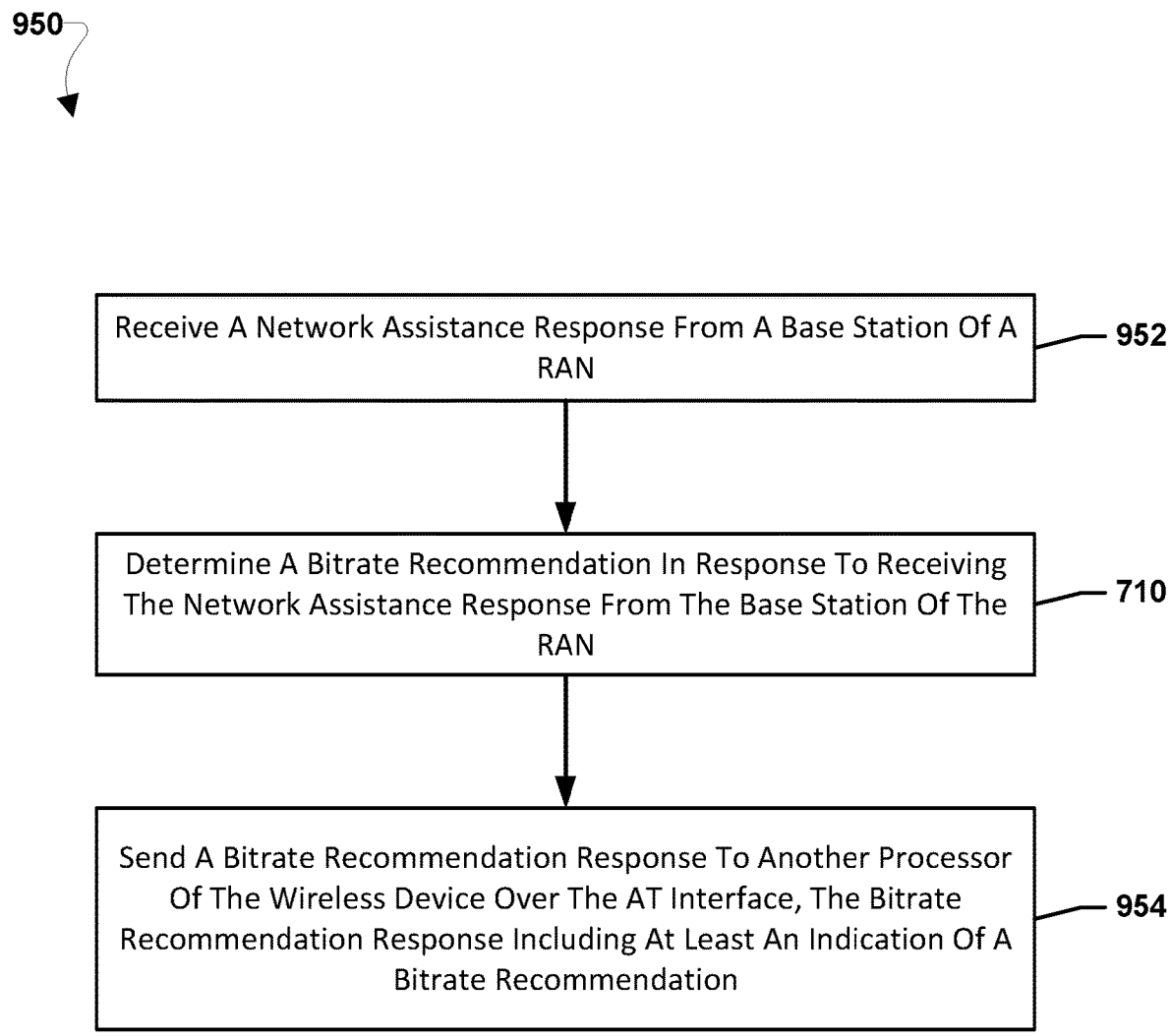
FIG. 9C is a process flow diagram illustrating a method performed by a modem processor of a wireless device for providing streaming service assistance in accordance with various embodiments.

FIG. 9C is a process flow diagram illustrating a method 950 performed by a modem processor of a wireless device for providing streaming service assistance in accordance with various embodiments. With reference to FIGS. 1A-9C, the method 950 may be implemented by a modem processor (e.g., 212, 252, 402) of a wireless device (e.g., the wireless device 120a-120e, 152, 154, 200, 320, 400). The operations of method 950 may be performed to support uplink streaming and/or downlink streaming. In various embodiments, the operations of method 950 may be performed in conjunction with the operations of method 600 (FIG. 6), 700 (FIG. 7), 800 (FIG. 8A), 810 (FIG. 8B), 900 (FIG. 9A), and/or 920 (FIG. 9B). In various embodiments, the operations of method 950 may be performed to send an unsolicited AT command. In various embodiments, the modem processor implementing the operations of method 950 may operate as a MT for purposes of AT command/response exchanges over an AT interface (e.g., 226, 250, 264, 420) with another processor (e.g., 216, 403) of the wireless device that may operate as a TE.

In block 952, the modem processor may perform operations including receiving a network assistance response from a base station of a RAN. The response may be unsolicited network assistance response from the RAN including a bitrate recommendation for the streaming service.

In block 710, the modem processor may perform operations as discussed with reference to like numbered block of method 700 (FIG. 7) to determine a bitrate recommendation in response to receiving the network assistance response from the base station of the RAN.

In block 954, the modem processor may perform operations including sending a bitrate recommendation response over the AT interface to another processor of the wireless device, the bitrate recommendation response including at least an indication of a bitrate recommendation. In some embodiments, a response that is a bitrate recommendation response may be sent as an unsolicited result code from a MT to a TE including a bitrate recommendation value provided by the MT in the form of an unsolicited notification. As a specific example, a response that is an unsolicited notification of a bitrate recommendation may be "+CGBRR [<recmBitrate>]". In this example, "<recmBitrate>" may be an indication of a bitrate recommendation, such as a bitrate recommendation value (e.g., in kbit/s).

Figure 9D:
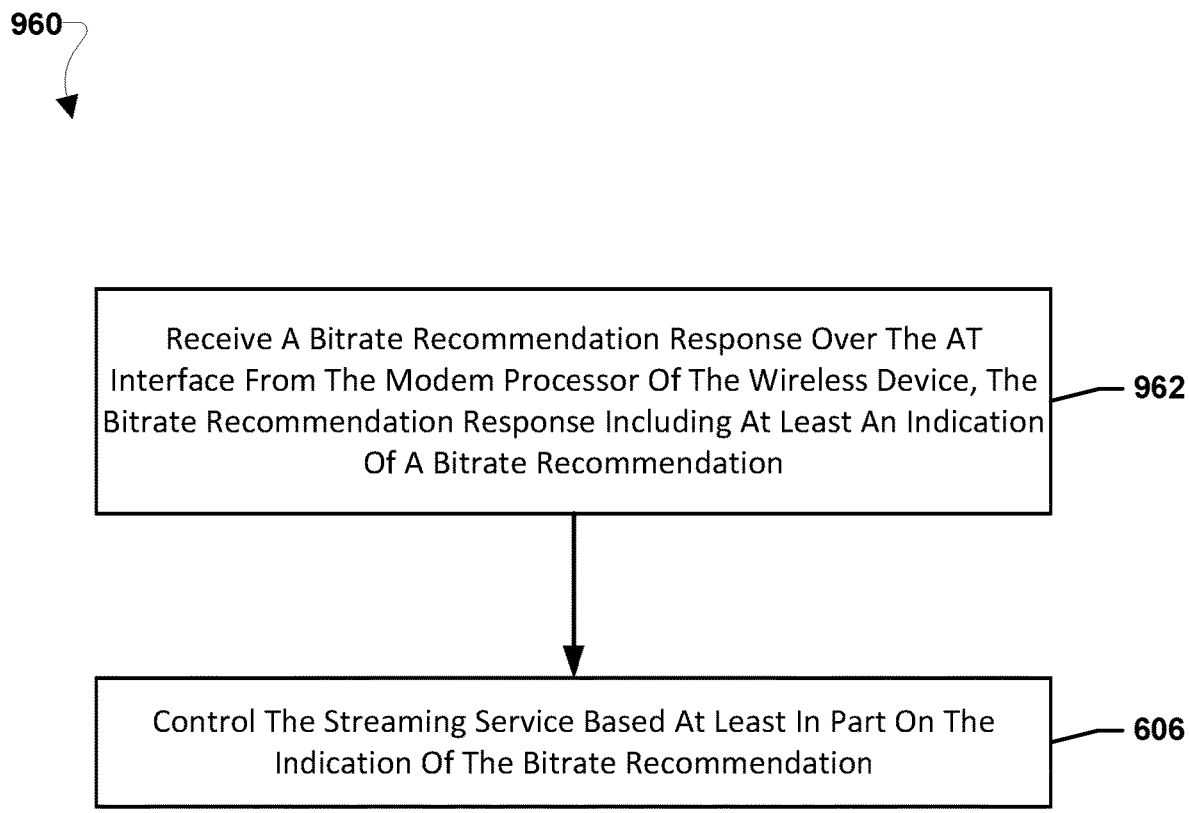
FIG. 9D is a process flow diagram illustrating a method performed by a processor of a wireless device for providing streaming service assistance in accordance with various embodiments.

FIG. 9D is a process flow diagram illustrating a method 960 performed by a processor of a wireless device for providing streaming service assistance in accordance with some embodiments. With reference to FIGS. 1A-9D, the method 960 may be implemented by a processor (e.g., 216, 403) of a wireless device (e.g., the wireless device 120a-120e, 152, 154, 200, 320, 400). The operations of the method 960 may be performed to support uplink streaming and/or downlink streaming. The operations of the method 960 may be performed in conjunction with the operations of method 600 (FIG. 6), 700 (FIG. 7), 800 (FIG. 8A), 810 (FIG. 8B), 900 (FIG. 9A), 920 (FIG. 9B), and/or 950 (FIG. 9C). In various embodiments, the operations of method 960 may be performed to receive an unsolicited AT command. The processor implementing the operations of the method 960 may operate as a TE for purposes of AT command/response exchanges over an AT interface (e.g., 226, 250, 264, 420) with a modem processor (e.g., 212, 252, 402) of the wireless device that may operate as a MT.

In block 962, the processor may perform operations including receiving a bitrate recommendation response over the AT interface from a modem processor of the wireless device, the bitrate recommendation response including at least an indication of a bitrate recommendation. In some embodiments, a response that is a bitrate recommendation response may be sent as an unsolicited result code from a MT to a TE including a bitrate recommendation value provided by the MT in the form of an unsolicited notification. As a specific example, a response that is an unsolicited notification of a bitrate recommendation may be "+CGBRR [<recmBitrate>]". In this example, "<recmBitrate>" may be an indication of a bitrate recommendation, such as a bitrate recommendation value (e.g., in kbit/s).

In block 606, the processor may perform operations as discussed with reference to like numbered block of the method 600 (FIG. 6) to control the streaming service based at least in part on the indication of the bitrate recommendation.

Figure 10:
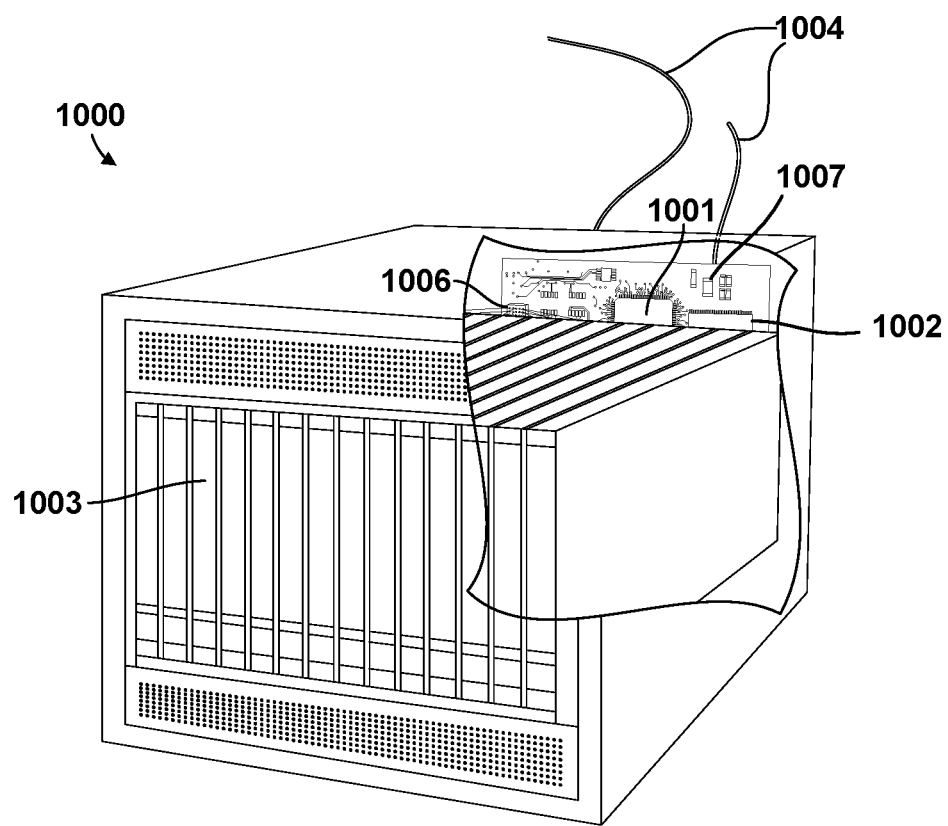
FIG. 10 is a component block diagram of a network computing device suitable for use with various embodiments.

Various embodiments may be implemented on a variety of wireless network devices, an example of which is illustrated in FIG. 10 in the form of a wireless network computing device 1000 functioning as a network element of a communication network, such as a base station (e.g., base station 110a-110d, 350, etc.). Such network computing devices may include at least the components illustrated in FIG. 10. With reference to FIGS. 1A-10, the network computing device 1000 may typically include a processor 1001 coupled to volatile memory 1002 and a large capacity nonvolatile memory, such as a disk drive 1003. The network computing device 1000 may also include a peripheral memory access device, such as a floppy disc drive, compact disc (CD) or digital video disc (DVD) drive 1006 coupled to the processor 1001. The network computing device 1000 may also include network access ports 1004 (or interfaces) coupled to the processor 1001 for establishing data connections with a network, such as the Internet and/or a local area network coupled to other system computers and servers. The network computing device 1000 may include one or more antennas 1007 for sending and receiving electromagnetic radiation that may be connected to a wireless communication link. The network computing device 1000 may include additional access ports, such as USB, Firewire, Thunderbolt, and the like for coupling to peripherals, external memory, or other devices.

Figure 11:
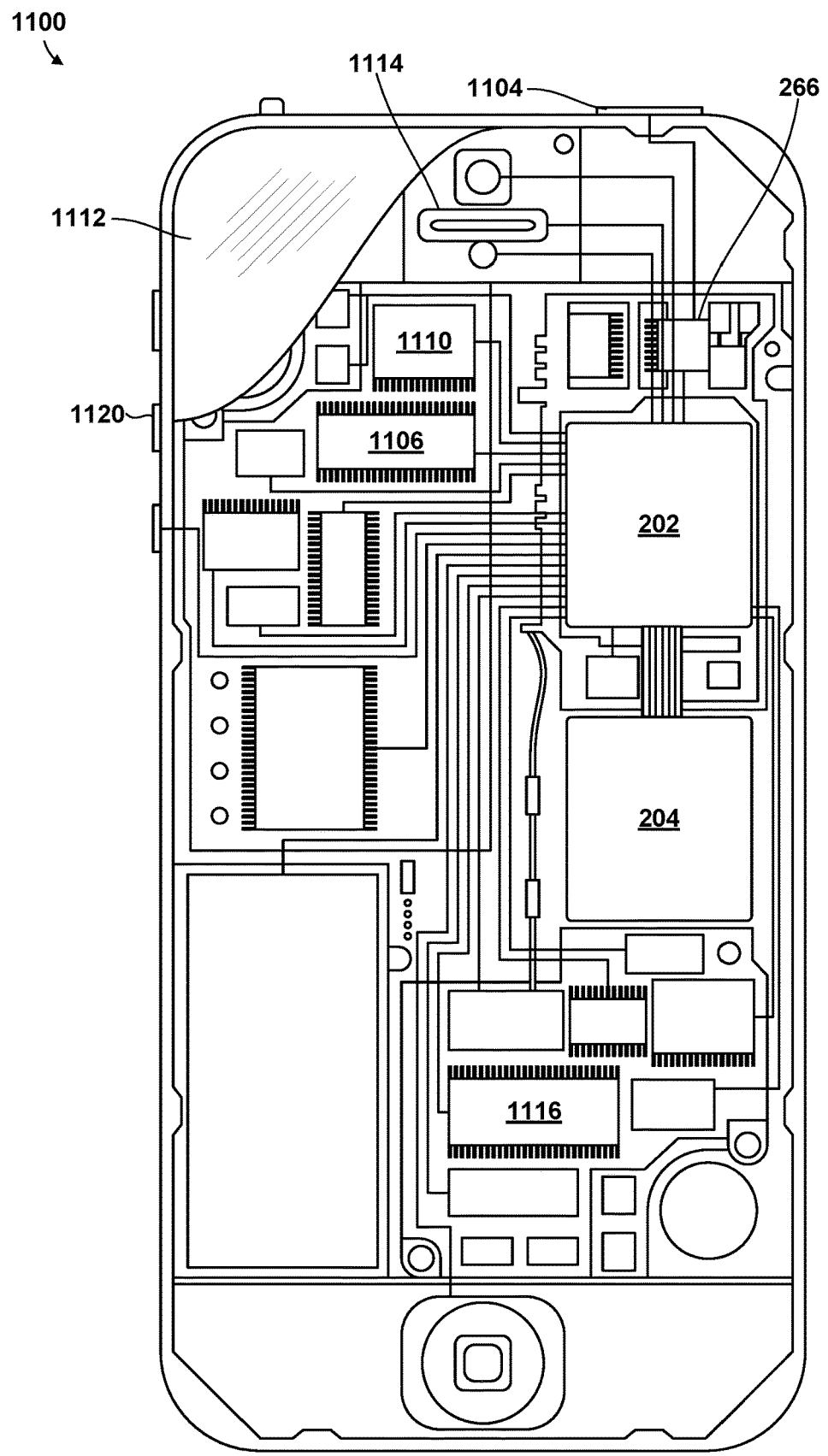
FIG. 11 is a component block diagram of a wireless device suitable for use with various embodiments.

Various embodiments may be implemented on a variety of wireless devices (e.g., the wireless device 120a-120e, 152, 154, 200, 320, 400), an example of which is illustrated in FIG. 11 in the form of a smartphone 1100. With reference to FIGS. 1A-11, the smartphone 1100 may include a first SOC 202 (e.g., a SOC-CPU) coupled to a second SOC 204 (e.g., a 5G capable SOC). The first and second SOCs 202, 204 may be coupled to internal memory 1106, 1116, a display 1112, and to a speaker 1114. Additionally, the smartphone 1100 may include an antenna 1104 for sending and receiving electromagnetic radiation that may be connected to a wireless data link and/or cellular telephone transceiver 266 coupled to one or more processors in the first and/or second SOCs 202, 204. Smartphones 1100 typically also include menu selection buttons or rocker switches 1120 for receiving user inputs.

A typical smartphone 1100 also includes a sound encoding/decoding (CODEC) circuit 1110, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC circuit 1110 may include a digital signal processor (DSP) circuit (not shown separately).

The processors of the wireless network computing device 1000 and the smart phone 1100 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Typically, software applications may be stored in the memory 1106, 1116 before they are accessed and loaded into the processor. The processors may include internal memory sufficient to store the application software instructions As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 600, 700, 800, 810, 900, 920, 950, and/or 960 may be substituted for or combined with one or more operations of the methods 600, 700, 800, 810, 900, 920, 950, and/or 960.

Implementation examples are described in the following paragraphs. While some of the following implementation examples are described in terms of example methods, further example implementations may include: the example methods discussed in the following paragraphs implemented by a wireless device including a processor configured to perform operations of the example methods; the example methods discussed in the following paragraphs implemented by a wireless device including a modem processor configured to perform operations of the example methods; the example methods discussed in the following paragraphs implemented by a wireless device including means for performing functions of the example methods; and the example methods discussed in the following paragraphs implemented as a non-transitory processor-readable storage medium having stored thereon processor-executable instructions configured to cause a processor or modem processor of a wireless device to perform the operations of the example methods.

Example 1. A method for providing streaming service assistance performed by a processor of a wireless device, including: sending to a modem processor of the wireless device over an AT interface, an AT command that is a bitrate recommendation action command for a streaming service, the bitrate recommendation action command including at least an indication of a stream identifier, an indication of a requested bitrate, and an indication of a direction; receiving a response over the AT interface that is a bitrate recommendation response from the modem processor of the wireless device, the bitrate recommendation response including at least the indication of the stream identifier, an indication of a bitrate recommendation, and the indication of the direction; and controlling the streaming service based at least in part on the indication of the bitrate recommendation.

Example 2. The method of example 1, in which the indication of the stream identifier is an indication of an EPS bearer for the streaming service.

Example 3. The method of example 1, in which the indication of the stream identifier is an indication of a PDU session for the streaming service.

Example 4. The method of example 3, in which: the bitrate recommendation action command further includes an indication of a QoS flow of the PDU session for the streaming service; and the bitrate recommendation response further includes the indication of the QoS flow of the PDU session for the streaming service.

Example 5. The method of any of examples 1-4, in which the direction is an indication of uplink or downlink.

Example 6. The method of any of examples 1-5, further including sending an AT command that is a test command to the modem processor of the wireless device over the AT interface.

Example 7. The method of any of examples 1-6, further including: sending an AT command that is a second bitrate recommendation action command to the modem processor of the wireless device over the AT interface, the second bitrate recommendation action command including at least the indication of the stream identifier, the indication of the requested bitrate, and the indication of the direction.

Example 8. The method of example 7, further including: receiving a response over the AT interface that is an error code from the modem processor of the wireless device indicating the second bitrate recommendation action command was sent prematurely.

Example 9. The method of example 8, in which the response over the AT interface that is the error code includes a retry-after parameter.

Example 10. The method of example 7, further including: receiving a response over the AT interface that is a second bitrate recommendation response from the modem processor of the wireless device, the second bitrate recommendation response including at least the indication of the stream identifier, the indication of the bitrate recommendation, the indication of the direction, and an indication of a time at which a network assistance response associated with the indication of the bitrate recommendation was received by the modem processor.

Example 11. The method of example 7, further including determining that the indication of the bitrate recommendation is still valid in response to not receiving a response to the AT command that is the second bitrate recommendation action command from the modem processor.

Example 12. The method of any of examples 1-11, in which controlling the streaming service based at least in part on the indication of the bitrate recommendation includes: converting the indication of the bitrate recommendation to an application level bitrate value; and controlling the streaming service based at least in part on the application level bitrate value.

Example 13. A method for providing streaming service assistance performed by a modem processor of a wireless device, including: receiving, from another processor of the wireless device over an AT interface, an AT command that is a bitrate recommendation action command for a streaming service, the bitrate recommendation action command including at least an indication of a first stream identifier, an indication of a requested bitrate, and an indication of a direction; determining a second stream identifier and a LCID associated with the indication of the first stream identifier in response to receiving the AT command that is a bitrate recommendation action command from the other processor of the wireless device; sending a network assistance request to a base station of a RAN including the second stream identifier and LCID; receiving a network assistance response from the base station of the RAN including the second stream identifier and LCID; determining a bitrate recommendation in response to receiving the network assistance response from the base station of the RAN; and sending a response that is a bitrate recommendation response to the other processor of the wireless device over the AT interface, the bitrate recommendation response including at least the indication of the first stream identifier, an indication of the bitrate recommendation, and the indication of the direction.

Example 14. The method of example 13, in which the indication of the first stream identifier is an indication of an EPS bearer for the streaming service.

Example 15. The method of example 13, in which the indication of the first stream identifier is an indication of a PDU session for the streaming service.

Example 16. The method of example 15, in which: the bitrate recommendation action command further includes an indication of a QoS flow of the PDU session for the streaming service; and the bitrate recommendation response further includes the indication of the QoS flow of the PDU session for the streaming service.

Example 17. The method of any of examples 13-16, in which the direction is an indication of uplink or downlink.

Example 18. The method of any of examples 13-17, further including: receiving an AT command that is a test command from the other processor of the wireless device over the AT interface; and sending a response that indicates bitrate recommendation is supported over the AT interface.

Example 19. The method of any of examples 13-17, further including: starting a response timer in response to receiving the AT command that is a bitrate recommendation action command from the other processor of the wireless device; receiving an AT command that is a second bitrate recommendation action command from the other processor of the wireless device over the AT interface, the second bitrate recommendation action command including at least the indication of the first stream identifier, the indication of the requested bitrate, and the indication of the direction; determining whether the second bitrate recommendation action command is received before the response timer expires; and taking a bitrate request frequency limiting action in response to determining that the second bitrate recommendation action command is received before the response timer expires.

Example 20. The method of example 19, in which the bitrate request frequency limiting action includes sending a response that is an error code to the other processor of the wireless device over the AT interface indicating the second bitrate recommendation action command was sent prematurely.

Example 21. The method of example 20, in which the response that is the error code includes a retry-after parameter.

Example 22. The method of example 19, in which the bitrate request frequency limiting action includes sending a response that is a second bitrate recommendation response to the other processor of the wireless device over the AT interface, the second bitrate recommendation response including at least the indication of the first stream identifier, the indication of the bitrate recommendation, the indication of the direction, and an indication of a time at which the network assistance response was received from the base station of the RAN.

Example 23. The method of example 19, in which the bitrate request frequency limiting action includes not sending a response to the AT command that is the second bitrate recommendation action command.

Example 24. The method of any of examples 13-23, in which: determining the bitrate recommendation in response to receiving the network assistance response from the base station of the RAN includes converting a bitrate recommendation indicated in the network assistance response from the base station of the RAN to an application level bitrate value; and the indication of the bitrate recommendation in the bitrate recommendation response is the application level bitrate value.

Example 25. A method for providing streaming service assistance performed by a processor of a wireless device, including: receiving a bitrate recommendation response from a modem processor of the wireless device over an AT interface, the bitrate recommendation response including at least an indication of a bitrate recommendation for a streaming service; and controlling the streaming service based at least in part on the indication of the bitrate recommendation.

Example 26. The method of example 25, in which the bitrate recommendation response includes an unsolicited response code.

Example 27. The method of example 25, in which the bitrate recommendation response is received following sending a bitrate recommendation to the modem processor over the AT interface.

Example 28. The method of example 26, further including sending an AT command to the modem processor of the wireless device over the AT interface subscribing to unsolicited bitrate recommendation responses prior to receiving the bitrate recommendation response.

Example 29. A method for providing streaming service assistance performed by a modem processor of a wireless device, including: receiving a network assistance response from a base station of a RAN; determining a bitrate recommendation in response to receiving the network assistance response from the base station of the RAN; and sending a bitrate recommendation response to another processor of the wireless device over an AT interface, the bitrate recommendation response including at least an indication of the bitrate recommendation.

Example 30. The method of example 29, in which the bitrate recommendation response includes an unsolicited response code.

Example 31. The method of example 30, further including receiving an AT command from the other processor of the wireless device over the AT interface subscribing to unsolicited bitrate recommendation responses prior to sending the bitrate recommendation response.

Example 32. The method of any of examples 1-31, wherein the modem processor is a fifth generation (5G) modem processor.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for providing streaming service assistance performed by a modem processor of a wireless device, comprising:
receiving, from another processor of the wireless device over an attention (AT) interface, an attention (AT) command that is a bitrate recommendation action command for a streaming service, the bitrate recommendation action command including at least an indication of a first stream identifier, an indication of a requested bitrate, and an indication of a direction;
determining a second stream identifier and a logical channel identifier (LCID) associated with the first indication of the stream identifier in response to receiving the AT command that is a bitrate recommendation action command from the other processor of the wireless device;
sending a network assistance request to a base station of a radio access network (RAN) including the second stream identifier and LCID;
receiving a network assistance response from the base station of the RAN including the second stream identifier and LCID;
determining a bitrate recommendation in response to receiving the network assistance response from the base station of the RAN; and
sending a response that is a bitrate recommendation response to the other processor of the wireless device over the AT interface, the bitrate recommendation response including at least the indication of the first stream identifier, an indication of the bitrate recommendation, and the indication of the direction.

2. The method of claim 1, wherein the indication of the first stream identifier is an indication of an Evolved Packet System (EPS) bearer for the streaming service.

3. The method of claim 1, wherein the indication of the first stream identifier is an indication of a Protocol Data Unit (PDU) session for the streaming service.

4. The method of claim 3, wherein:
the bitrate recommendation action command further includes an indication of a Quality of Service (QoS) flow of the PDU session for the streaming service; and
the bitrate recommendation response further includes the indication of the QoS flow of the PDU session for the streaming service.

5. The method of claim 1, wherein the direction is an indication of uplink or downlink.

6. The method of claim 1, further comprising:
starting a response timer in response to receiving the AT command that is a bitrate recommendation action command from the other processor of the wireless device;
receiving an AT command that is a second bitrate recommendation action command from the other processor of the wireless device over the AT interface, the second bitrate recommendation action command including at least the indication of the first stream identifier, the indication of the requested bitrate, and the indication of the direction;
determining whether the second bitrate recommendation action command is received before the response timer expires; and taking a bitrate request frequency limiting action in response to determining that the second bitrate recommendation action command is received before the response timer expires.

7. The method of claim 6, wherein the bitrate request frequency limiting action comprises sending a response that is an error code to the other processor of the wireless device over the AT interface indicating the second bitrate recommendation action command was sent prematurely.

8. The method of claim 7, wherein the response that is the error code includes a retry-after parameter.

9. The method of claim 6, wherein the bitrate request frequency limiting action comprises sending a response that is a second bitrate recommendation response to the other processor of the wireless device over the AT interface, the second bitrate recommendation response including at least the indication of the first stream identifier, the indication of the bitrate recommendation, the indication of the direction, and an indication of a time at which the network assistance response was received from the base station of the RAN.

10. The method of claim 6, wherein the bitrate request frequency limiting action comprises not sending a response to the AT command that is the second bitrate recommendation action command.

11. The method of claim 1, wherein:
determining the bitrate recommendation in response to receiving the network assistance response from the base station of the RAN comprises converting a bitrate recommendation indicated in the network assistance response from the base station of the RAN to an application level bitrate value; and
the indication of the bitrate recommendation in the bitrate recommendation response is the application level bitrate value.

12. A wireless device, comprising:
a modem processor configured with processor-executable instructions to perform operations to:
receive, from another processor of the wireless device over an attention (AT) interface, an attention (AT) command that is a bitrate recommendation action command for a streaming service, the bitrate recommendation action command including at least an indication of a first stream identifier, an indication of a requested bitrate, and an indication of a direction;
determine a second stream identifier and a logical channel identifier (LCID) associated with the first indication of the stream identifier in response to receiving the AT command that is a bitrate recommendation action command from the other processor of the wireless device;
send a network assistance request to a base station of a radio access network (RAN) including the second stream identifier and LCID;
receive a network assistance response from the base station of the RAN including the second stream identifier and LCID;
determine a bitrate recommendation in response to receiving the network assistance response from the base station of the RAN; and
send a response that is a bitrate recommendation response to the other processor of the wireless device over the AT interface, the bitrate recommendation response including at least the indication of the first stream identifier, an indication of the bitrate recommendation, and the indication of the direction.

13. The wireless device of claim 12, wherein the indication of the first stream identifier is an indication of an Evolved Packet System (EPS) bearer for the streaming service.

14. The wireless device of claim 12, wherein the indication of the first stream identifier is an indication of a Protocol Data Unit (PDU) session for the streaming service.

15. The wireless device of claim 14, wherein:
the bitrate recommendation action command further includes an indication of a Quality of Service (QoS) flow of the PDU session for the streaming service; and
the bitrate recommendation response further includes the indication of the QoS flow of the PDU session for the streaming service.

16. The wireless device of claim 12, wherein the modem processor is further configured with processor-executable instructions to perform operations to:
start a response timer in response to receiving the AT command that is a bitrate recommendation action command from the other processor of the wireless device;
receive an AT command that is a second bitrate recommendation action command from the other processor of the wireless device over the AT interface, the second bitrate recommendation action command including at least the indication of the first stream identifier, the indication of the requested bitrate, and the indication of the direction;
determine whether the second bitrate recommendation action command is received before the response timer expires; and
take a bitrate request frequency limiting action in response to determining that the second bitrate recommendation action command is received before the response timer expires.

17. The wireless device of claim 16, wherein the modem processor is further configured with processor-executable instructions to perform operations such that the bitrate request frequency limiting action comprises sending a response that is an error code to the other processor of the wireless device over the AT interface indicating the second bitrate recommendation action command was sent prematurely.

18. The wireless device of claim 17, wherein the response that is the error code includes a retry-after parameter.

19. The wireless device of claim 16, wherein the modem processor is further configured with processor-executable instructions to perform operations such that the bitrate request frequency limiting action comprises sending a response that is a second bitrate recommendation response to the other processor of the wireless device over the AT interface, the second bitrate recommendation response including at least the indication of the first stream identifier, the indication of the bitrate recommendation, the indication of the direction, and an indication of a time at which the network assistance response was received from the base station of the RAN.

20. The wireless device of claim 16, wherein the modem processor is further configured with processor-executable instructions to perform operations such that the bitrate request frequency limiting action comprises not sending a response to the AT command that is the second bitrate recommendation action command.

21. The wireless device of claim 12, wherein:
the modem processor is further configured with processor-executable instructions to perform operations to determine the bitrate recommendation in response to receiving the network assistance response from the base station of the RAN by converting a bitrate recommendation indicated in the network assistance response from the base station of the RAN to an application level bitrate value; and the indication of the bitrate recommendation in the bitrate recommendation response is the application level bitrate value.

22. A wireless device, comprising:

means for receiving, from another processor of the wireless device over an attention (AT) interface, an attention (AT) command that is a bitrate recommendation action command for a streaming service, the bitrate recommendation action command including at least an indication of a first stream identifier, an indication of a requested bitrate, and an indication of a direction;

means for determining a second stream identifier and a logical channel identifier (LCID) associated with the indication of the first stream identifier in response to receiving the AT command that is a bitrate recommendation action command from the other processor of the wireless device;

means for sending a network assistance request to a base station of a radio access network (RAN) including the second stream identifier and LCID;

means for receiving a network assistance response from the base station of the RAN including the second stream identifier and LCID;

means for determining a bitrate recommendation in response to receiving the network assistance response from the base station of the RAN; and means for sending a response that is a bitrate recommendation response to the other processor of the wireless device over the AT interface, the bitrate recommendation response including at least the indication of the first stream identifier, an indication of the bitrate recommendation, and the indication of the direction.

23. The wireless device of claim 22, wherein the indication of the first stream identifier is an indication of an Evolved Packet System (EPS) bearer for the streaming service.

24. The wireless device of claim 22, wherein the indication of the first stream identifier is an indication of a Protocol Data Unit (PDU) session for the streaming service.

25. The wireless device of claim 24, wherein:

the bitrate recommendation action command further includes an indication of a Quality of Service (QoS) flow of the PDU session for the streaming service; and the bitrate recommendation response further includes the indication of the QoS flow of the PDU session for the streaming service.

26. The wireless device of claim 22, further comprising:

means for starting a response timer in response to receiving the AT command that is a bitrate recommendation action command from the other processor of the wireless device;

means for receiving an AT command that is a second bitrate recommendation action command from the other processor of the wireless device over the AT interface, the second bitrate recommendation action command including at least the indication of the first stream identifier, the indication of the requested bitrate, and the indication of the direction;

means for determining whether the second bitrate recommendation action command is received before the response timer expires; and means for taking a bitrate request frequency limiting action in response to determining that the second bitrate recommendation action command is received before the response timer expires.

27. The wireless device of claim 26, wherein the bitrate request frequency limiting action comprises sending a response that is an error code to the other processor of the wireless device over the AT interface indicating the second bitrate recommendation action command was sent prematurely.

28. The wireless device of claim 27, wherein the response that is the error code includes a retry-after parameter.

29. The wireless device of claim 26, wherein the bitrate request frequency limiting action comprises sending a response that is a second bitrate recommendation response to the other processor of the wireless device over the AT interface, the second bitrate recommendation response including at least the indication of the first stream identifier, the indication of the bitrate recommendation, the indication of the direction, and an indication of a time at which the network assistance response was received from the base station of the RAN.

30. The wireless device of claim 26, wherein the bitrate request frequency limiting action comprises not sending a response to the AT command that is the second bitrate recommendation action command.

31. The wireless device of claim 22, wherein:

means for determining the bitrate recommendation in response to receiving the network assistance response from the base station of the RAN comprises converting a bitrate recommendation indicated in the network assistance response from the base station of the RAN to an application level bitrate value; and the indication of the bitrate recommendation in the bitrate recommendation response is the application level bitrate value.

32. A non-transitory processor readable medium having stored thereon processor-executable instructions configured to cause a modem processor of a wireless device to perform operations comprising:

receiving, from another processor of the wireless device over an attention (AT) interface, an attention (AT) command that is a bitrate recommendation action command for a streaming service, the bitrate recommendation action command including at least an indication of a first stream identifier, an indication of a requested bitrate, and an indication of a direction;

determining a second stream identifier and a logical channel identifier (LCID) associated with the indication of the first stream identifier in response to receiving the AT command that is a bitrate recommendation action command from the other processor of the wireless device;

sending a network assistance request to a base station of a radio access network (RAN) including the second stream identifier and LCID;

receiving a network assistance response from the base station of the RAN including the second stream identifier and LCID;

determining a bitrate recommendation in response to receiving the network assistance response from the base station of the RAN; and sending a response that is a bitrate recommendation response to the other processor of the wireless device over the AT interface, the bitrate recommendation response including at least the indication of the first stream identifier, an indication of the bitrate recommendation, and the indication of the direction.

33. The non-transitory processor readable medium of claim 32, wherein the indication of the first stream identifier is an indication of an Evolved Packet System (EPS) bearer for the streaming service.

34. The non-transitory processor readable medium of claim 32, wherein the indication of the first stream identifier is an indication of a Protocol Data Unit (PDU) session for the streaming service.

35. The non-transitory processor readable medium of claim 34, wherein:
the bitrate recommendation action command further includes an indication of a Quality of Service (QoS) flow of the PDU session for the streaming service; and
the processor-executable instructions are configured to cause a modem processor of a wireless device to perform operations such that the bitrate recommendation response further includes the indication of the QoS flow of the PDU session for the streaming service.

36. The non-transitory processor readable medium of claim 32, wherein the processor-executable instructions are configured to cause a modem processor of a wireless device to perform operations further comprising:
starting a response timer in response to receiving the AT command that is a bitrate recommendation action command from the other processor of the wireless device;
receiving an AT command that is a second bitrate recommendation action command from the other processor of the wireless device over the AT interface, the second bitrate recommendation action command including at least the indication of the first stream identifier, the indication of the requested bitrate, and the indication of the direction;
determining whether the second bitrate recommendation action command is received before the response timer expires; and
taking a bitrate request frequency limiting action in response to determining that the second bitrate recommendation action command is received before the response timer expires.

37. The non-transitory processor readable medium of claim 36, wherein the processor-executable instructions are configured to cause a modem processor of a wireless device to perform operations such that the bitrate request frequency limiting action comprises sending a response that is a second bitrate recommendation response to the other processor of the wireless device over the AT interface, the second bitrate recommendation response including at least the indication of the first stream identifier, the indication of the bitrate recommendation, the indication of the direction, and an indication of a time at which the network assistance response was received from the base station of the RAN.

38. The non-transitory processor readable medium of claim 36, wherein the processor-executable instructions are configured to cause a modem processor of a wireless device to perform operations such that the bitrate request frequency limiting action comprises not sending a response to the AT command that is the second bitrate recommendation action command.

39. The non-transitory processor readable medium of claim 32, wherein the processor-executable instructions are configured to cause a modem processor of a wireless device to perform operations such that:
determining the bitrate recommendation in response to receiving the network assistance response from the base station of the RAN comprises converting a bitrate recommendation indicated in the network assistance response from the base station of the RAN to an application level bitrate value; and
the indication of the bitrate recommendation in the bitrate recommendation response is the application level bitrate value.

\* \* \* \* \*